US008878874B2

(12) United States Patent
Yano

(10) Patent No.: US 8,878,874 B2
(45) Date of Patent: Nov. 4, 2014

(54) IMAGE OVERLAYING DEVICE AND IMAGE OVERLAYING PROGRAM

(75) Inventor: Keigo Yano, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 331 days.

(21) Appl. No.: 12/894,714

(22) Filed: Sep. 30, 2010

(65) Prior Publication Data

US 2011/0148925 A1    Jun. 23, 2011

(30) Foreign Application Priority Data

Dec. 21, 2009    (JP) ................................. 2009-289047

(51) Int. Cl.
G09G 5/02 (2006.01)
G03G 15/36 (2006.01)
H04N 1/32 (2006.01)
G06F 17/21 (2006.01)

(52) U.S. Cl.
CPC ........... H04N 1/32122 (2013.01); G03G 15/36 (2013.01); *H04N 2201/3254* (2013.01); G06F 17/212 (2013.01)
USPC ........... 345/634; 382/173; 382/176; 358/1.18

(58) Field of Classification Search
None
See application file for complete search history.

(56) References Cited

U.S. PATENT DOCUMENTS

| 4,807,287 | A | | 2/1989 | Tucker et al. | |
|---|---|---|---|---|---|
| 5,500,680 | A | | 3/1996 | Lee | |
| 5,745,664 | A | * | 4/1998 | Nomura et al. | 358/1.18 |
| 6,002,798 | A | * | 12/1999 | Palmer et al. | 382/176 |
| 6,178,273 | B1 | * | 1/2001 | Kuga | 382/305 |
| 6,370,568 | B1 | * | 4/2002 | Garfinkle | 709/206 |
| 7,015,911 | B2 | * | 3/2006 | Shaughnessy et al. | 345/440 |
| 7,424,672 | B2 | * | 9/2008 | Simske et al. | 715/243 |
| 7,840,092 | B2 | | 11/2010 | Sato et al. | |
| 8,169,652 | B2 | | 5/2012 | Yoda | |

(Continued)

FOREIGN PATENT DOCUMENTS

CN    1086921 A      5/1994
EP    1748365 A1 *  1/2007

(Continued)

OTHER PUBLICATIONS

Notice of Allowance dated Apr. 3, 2012 from related U.S. Appl. No. 12/711,700.

(Continued)

*Primary Examiner* — Kee M Tung
*Assistant Examiner* — William Beutel
(74) *Attorney, Agent, or Firm* — Scully, Scott, Murphy & Presser, P.C.

(57) ABSTRACT

An image overlaying device includes an image inputting unit, a memory and a controller. The controller is configured to obtain template data which define a plurality of layout areas and to extract each of the plurality of layout areas from the obtained template data. The controller determines positions of the extracted plurality of layout areas. The controller stores, in the memory, layout order information corresponding to an order of the layout area and further stores, in the memory image order information corresponding to an order of the image data of the documents The controller determines corresponding image data of documents corresponding to each of the plurality of layout areas and generates overlaid image data by laying out, in each of the plurality of layout areas, the determined corresponding image data of the documents.

9 Claims, 11 Drawing Sheets

(56) References Cited

U.S. PATENT DOCUMENTS

| | | |
|---|---|---|
| 8,184,343 B2 | 5/2012 | Tani et al. |
| 2003/0068099 A1 | 4/2003 | Chao et al. |
| 2003/0160977 A1 | 8/2003 | Nishikawa et al. |
| 2003/0202193 A1 | 10/2003 | Yokochi |
| 2004/0169664 A1* | 9/2004 | Hoffman et al. ............. 345/629 |
| 2006/0119885 A1* | 6/2006 | Jeon et al. ................... 358/1.15 |
| 2007/0055929 A1* | 3/2007 | Giannetti et al. ............ 715/517 |
| 2007/0089053 A1* | 4/2007 | Uhlig et al. ................... 715/513 |
| 2007/0091373 A1 | 4/2007 | Sato et al. |
| 2008/0184156 A1* | 7/2008 | Sato .............................. 715/777 |
| 2009/0016605 A1* | 1/2009 | Chao et al. ................... 382/176 |
| 2010/0214584 A1 | 8/2010 | Takahashi |
| 2010/0220343 A1 | 9/2010 | Horikawa |

FOREIGN PATENT DOCUMENTS

| | | |
|---|---|---|
| JP | 5-81266 | 4/1993 |
| JP | 8-289132 | 11/1996 |
| JP | 2001-56857 | 2/2001 |
| JP | 2001-76127 | 3/2001 |
| JP | 2006-114971 | 4/2006 |
| JP | 2006-135819 | 5/2006 |
| JP | 2007-49518 | 2/2007 |
| JP | 2007-116469 | 5/2007 |
| JP | 2010-200070 | 9/2010 |

OTHER PUBLICATIONS

U.S. Office Action dated Apr. 4, 2012 from related U.S. Appl. No. 12/711,772.

Decision to Grant a Patent dated Jan. 24, 2012 received from the Japanese Patent Office from related Japanese Application No. 2009-289047, together with a partial English-language translation.

Notice of Allowance dated Aug. 23, 2012 from related U.S. Appl. No. 12/711,687.

Chinese Official Action dated Aug. 15, 2013 from related application CN 201010270710.8.

Decision of Rejection against the related Chinese patent application No. 201010270710.8 dated Feb. 18, 2014.

Chinese Official Action dated Jan. 24, 2013 from related application CN 201010270710.8 together with an English language translation.

* cited by examiner

IMAGE OVERLAYING DEVICE AND IMAGE OVERLAYING PROGRAM

CROSS REFERENCE TO RELATED APPLICATION

The present application claims priority from Japanese Patent Application No. 2009-289047, filed on Dec. 21, 2009, the disclosure of which is incorporated herein by reference in its entirely.

BACKGROUND

1. Technical Field

The present invention relates to an image overlaying device and an image overlaying program capable of generating image data by overlaying a plurality of image data.

2. Related Art

An image processing apparatus for overlaying and editing a plurality of image data is known. The known image processing apparatus provides, for a user, a print result obtained through overlay by laying out image data based on a plurality of documents in prescribed areas specified by the user. The known image processing apparatus reads the plural documents one by one and overlays the image data based on the read documents in the specified areas, however, a user is required to perform complicated operations on each of the documents because there arise operations of "reading a document", "determining an area where an image is to be laid out" and the like to be performed by the user on each document in the case where a plurality of image data based on documents are to be overlaid into one data.

SUMMARY

A need has arisen to provide an image overlaying device and an image overlaying program which improves the convenience in obtaining image data overlaid by image data of documents.

According to an embodiment of the invention, an image overlaying device comprises an image inputting unit configured to input image data of documents, a memory and a controller. The controller is configured to obtain template data which define a plurality of layout areas for laying out the inputted image data of the documents. The controller is further configured to extract each of the plurality of layout areas from the obtained template data and to determine positions of the extracted plurality of layout areas. The controller is still further configured to store, in the memory, in association with each of layout areas, layout order information corresponding to an order of the layout area in accordance with a prescribed reference on the basis of the determined positions of the plurality of layout areas. Moreover, the controller is configured to store, in the memory, in association with each of the image data, image order information corresponding to an order of the image data of the documents. The controller is configured to determine corresponding image data of documents corresponding to each of the plurality of layout areas on the basis of the layout order information and the image order information. The controller is further configured to generate overlaid image data by laying out, in each of the plurality of layout areas, the determined corresponding image data of the documents.

According to an embodiment of the invention, a computer-readable medium for an image overlaying device comprising a memory and an image inputting unit configured to input image data of documents. The computer-readable medium stores instructions which causes, when executed, a processor to execute steps of obtaining template data which define a plurality of layout areas for laying out the inputted image data of the documents. The instructions further causes the processor to execute steps of extracting each of the plurality of layout areas from the obtained template data and of determining positions of the extracted plurality of layout areas. The instructions still further causes the processor to execute steps of storing, in the memory, in association with each of layout areas, layout order information corresponding to an order of the layout area in accordance with a prescribed reference on the basis of the determined positions of the plurality of layout areas. Moreover, the instructions further causes the processor to execute step of storing, in the memory, in association with each of the image data, image order information corresponding to an order of the image data of the documents. The instructions further causes the processor to execute step determining corresponding image data of documents corresponding to each of the plurality of layout areas on the basis of the layout order information and the image order information. The instructions still further causes the processor to execute step of generating overlaid image data by laying out, in each of the plurality of layout areas, the determined corresponding image data of the documents.

BRIEF DESCRIPTION OF THE DRAWINGS

For a more complete understanding of the present invention, the needs satisfied thereby, and the features and advantages thereof, reference now is made to the following descriptions taken in connection with the accompanying drawings wherein.

DESCRIPTION OF PREFERRED EMBODIMENTS

Embodiments of the invention and their features and advantages may be understood by referring to FIGS. 1-10, like numerals being used for like corresponding parts in the various drawings. In the description given below, an entire configuration of a color printer as an example of an image forming apparatus in brief first, and then characteristic portions of the invention will be described in detail.

<Configuration of System>

Figure 1:
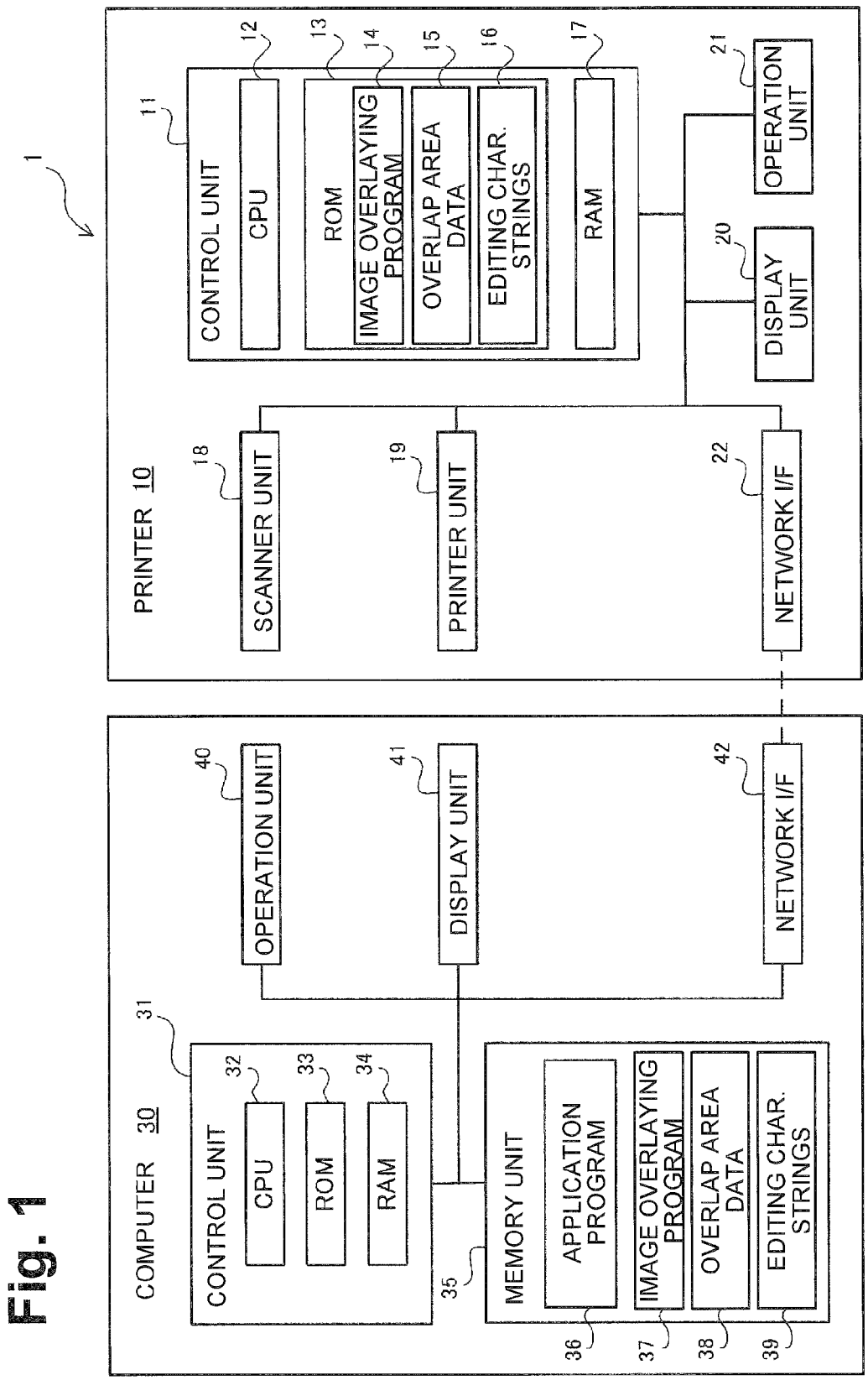
FIG. 1 is a block diagram roughly illustrating the configuration of an image overlaying system.

The image overlaying system 1 including the printer 10 and the computer 30 will be described with reference to FIG. 1. The printer 10 and the computer 30 are connected to each other through a LAN (Local Area Network) so that data may be sent/received therebetween. The connection method between the printer 10 and the computer 30 is not limited to the LAN but may be USB connection or parallel connection.

Now, respective apparatuses will be described. First, the printer 10 will be described. The printer 10 includes a control unit 11 (an example of a controller), a scanner unit 18 (an example of an image inputting unit), a printer unit 19, a display unit 20, an operation unit 21 and a network interface (hereinafter referred to as the "network I/F") 22.

The control unit 11 controls the apparatus it belongs to, and includes a CPU 12, a ROM 13 and a RAM 17. The CPU 12 controls respective functions of the printer 10 in accordance with fixed values and programs stored in the ROM 13 and the RAM 17.

The ROM 13 is an unrewritable memory for storing a control program and the like to be executed in the printer. The ROM 13 stores an image overlaying program 14, overlap area data 15 and editing character strings 16.

Figure 3:
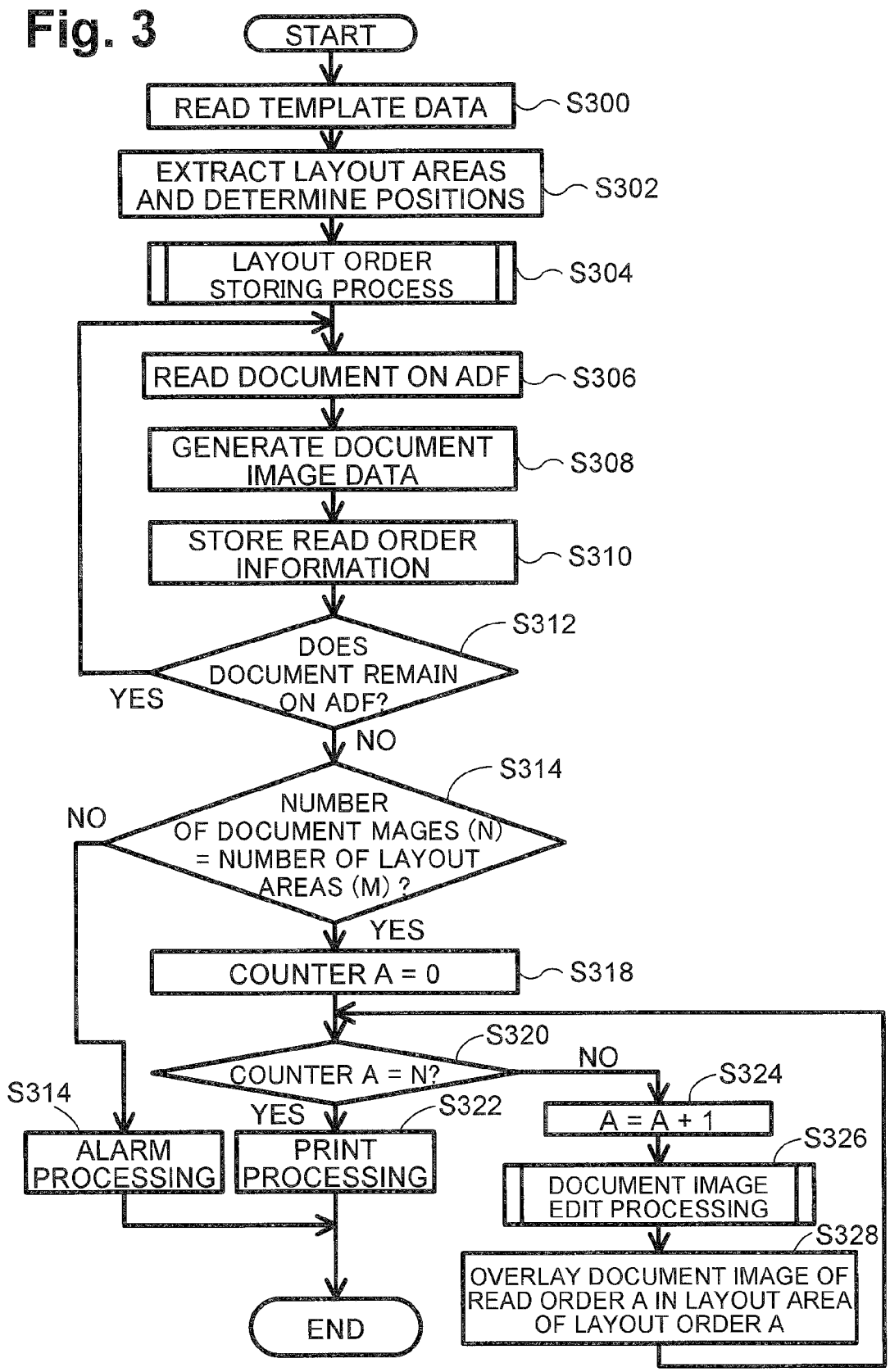
FIG. 3 is a flowchart of an image overlaying process.
Figure 4A:
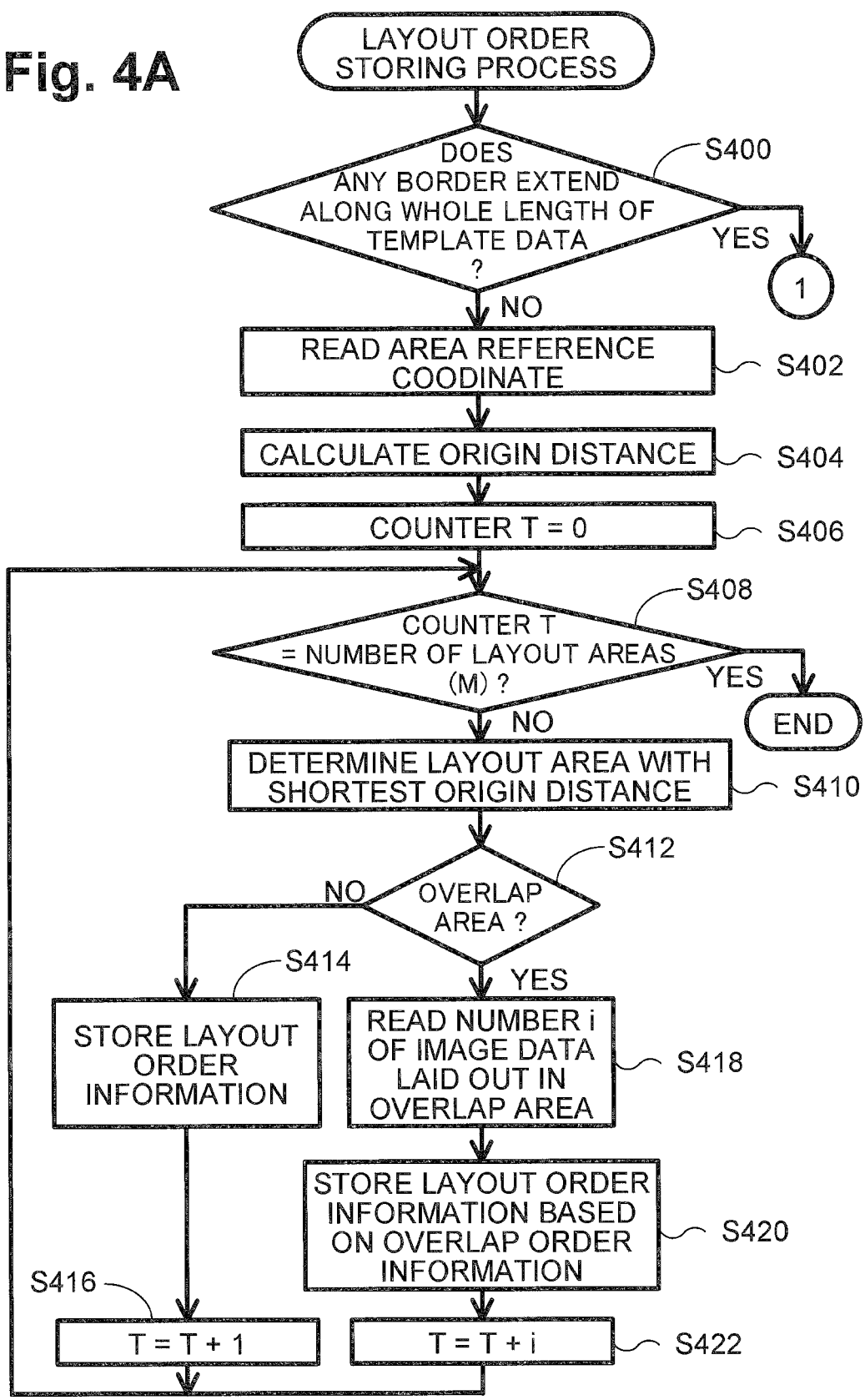
FIGS. 4A and 4B show a flowchart of a layout order storing process.
Figure 4B:
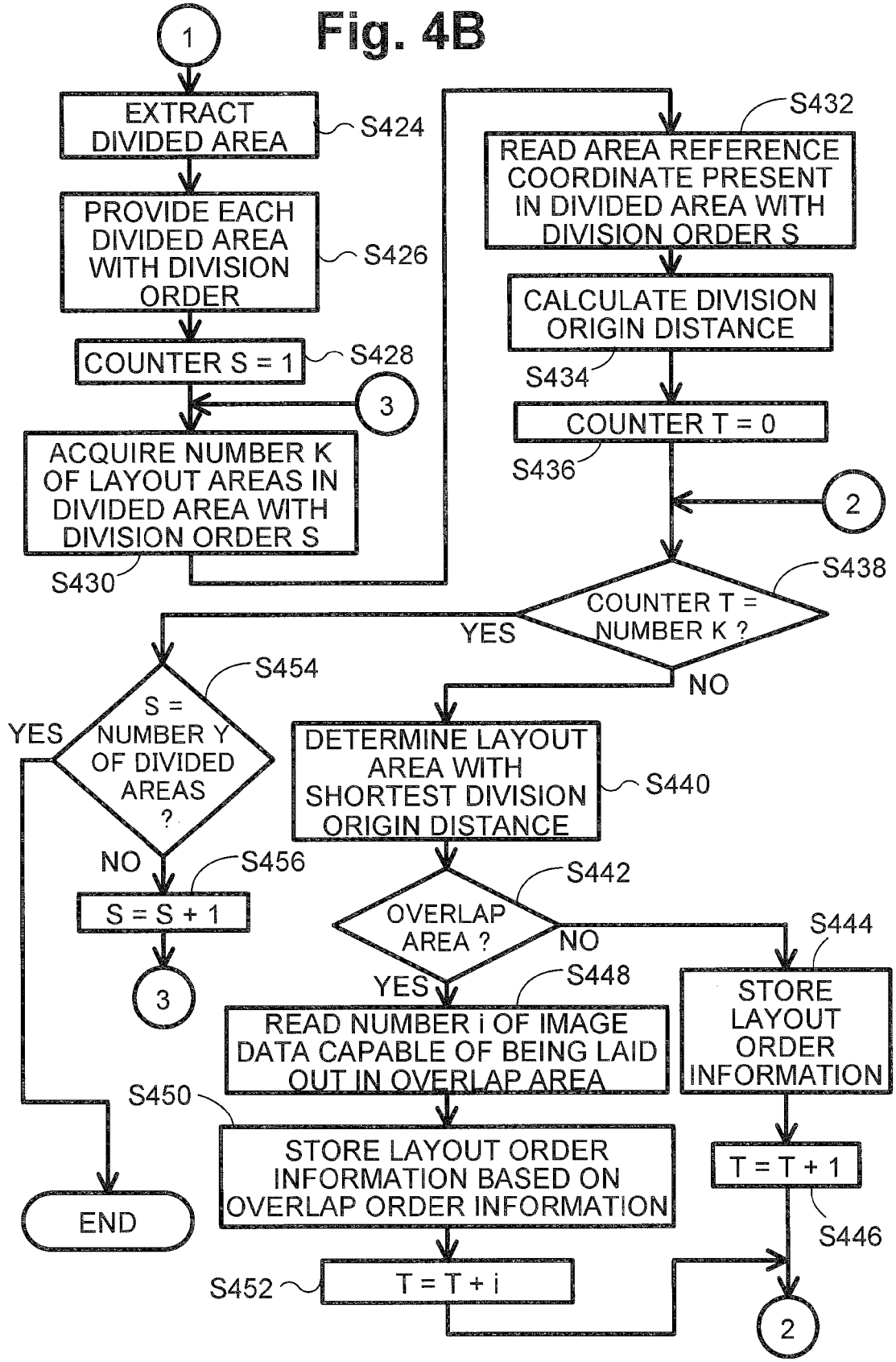
Figure 5:
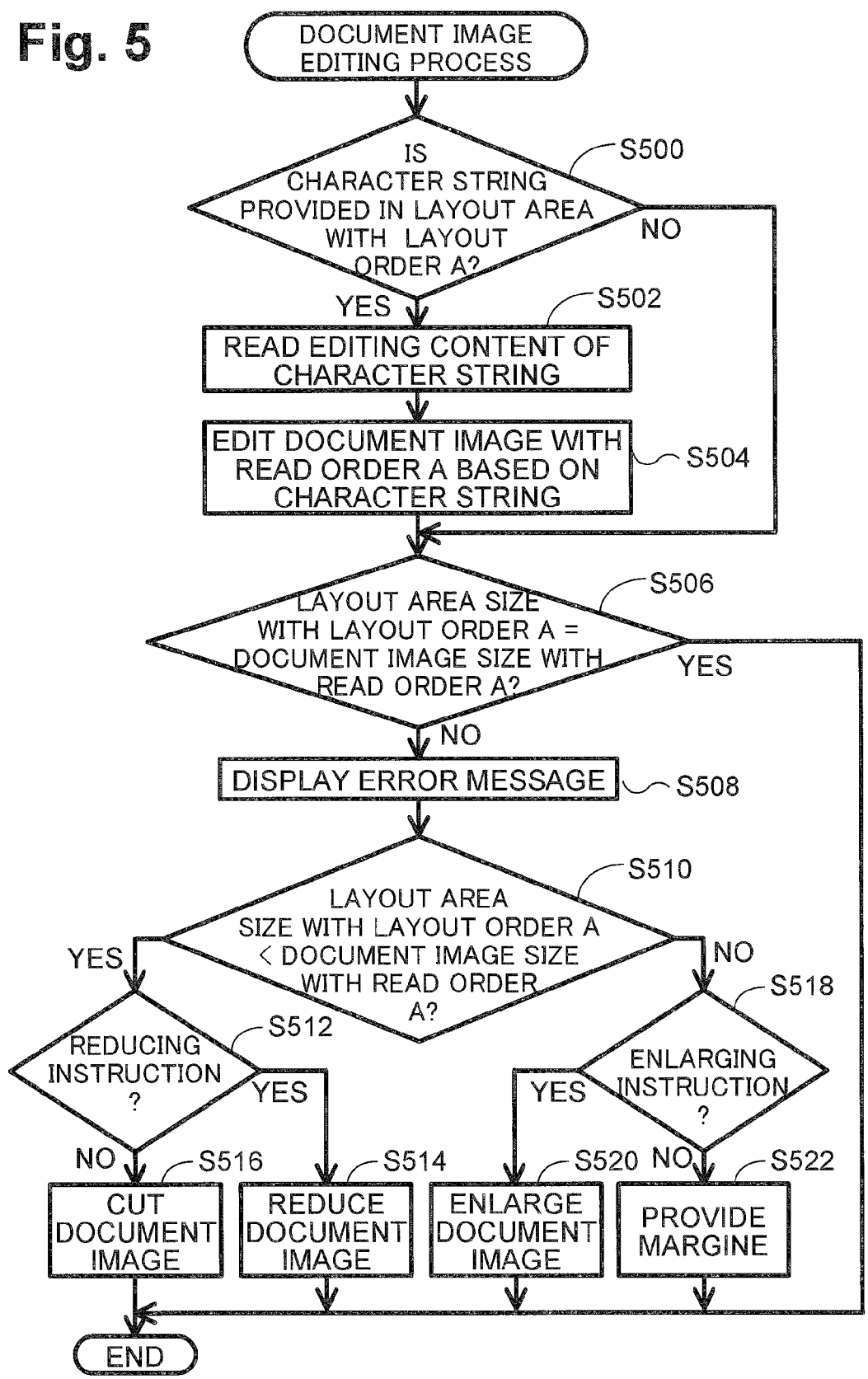
FIG. 5 is a flowchart of a document image editing process.

The image overlaying program 14 includes programs for executing, specifically, an image overlaying process illustrated in a flowchart of FIG. 3, a layout order storing process illustrated in a flowchart of FIGS. 4A and 4B, and a document image editing process illustrated in a flowchart of FIG. 5.

The overlap area data 15 is data for storing a shape of an overlap area where a plurality of document image data are laid out so as to partly overlap each other. Document image data is image data of a document read by the scanner unit 18. The overlap area data 15 includes a plurality of kinds of shapes of the overlap area, and with respect to each shape of the overlap area, the number of document image data to be laid out in the overlap area and overlap order information corresponding to a layout area and a layout order of each document image data in the overlap area are stored in association with each other.

In this embodiment, an overlap area is a layout area where two document image data are laid out so as to partly overlap each other, and four kinds of shapes illustrated in FIGS. 2A through 2D are stored as a part of the overlap area data 15. Specifically, the number of document image data to be laid out in each overlap area is two in this embodiment, and this numerical value is stored in association with each shape of the overlap area. The layout positions of respective document image data included in the overlap order information are, in the overlap area of FIG. 2A for example, a layout area 100 hatched with lines sloping from right to left and a layout area 102 hatched with lines sloping from left to right. The layout order of each document image data included in the overlap order information is, in FIG. 2A for example, a numerical value "1" or "2" provided in the layout area 100 or the layout area 102. Layout order information described later is ordered in the order of the layout area 100 and the layout area 102. In the case of the overlap area of FIG. 2A, out of two document image data, document image data with a smaller numerical value corresponding to read order information described later is laid out in the layout area 100, and document image data with a larger numerical value corresponding to the read order information is laid out in the layout area 102.

The editing character strings 16 are data for storing a character string and an editing content in association with each other. The character string herein is a character string corresponding to an editing content such as "color", "monochrome", "boxed" or "not boxed". An editing content stored in association with a character string is a program for executing editing processing with the content corresponding to each character string. For example, the editing character strings 16 includes, in association with a character string of "monochrome", a processing program for performing monochrome processing on color image data to be laid out in a layout area provided with the character string of "monochrome" and laying out the resultant data in this layout area.

The RAM 17 is a rewritable volatile memory used for temporarily storing various data. The RAM 17 stores document image data read by the scanner unit 18, document image data acquired from the computer 30 and the like.

In this embodiment, the RAM 17 stores document image data read by the scanner unit 18 and read order information corresponding to the document image data in association with each other. The read order information is information corresponding to the order of reading a plurality of documents placed on an ADF described later. In this embodiment, numbers corresponding to the order of a plurality of documents placed on the ADF in continuously reading them are employed as the read order information.

Furthermore, in this embodiment, the RAM 17 stores a layout area included in template data and layout order information corresponding to the layout area in association with each other. The layout order information is information for ordering respective layout areas on the basis of the shortest distance between a given corner of the template data to a given corner of each layout area. In this embodiment, numbers obtained by ordering layout areas in the ascending order of the shortest distance from the upper left corner of template data to the upper left corner of each layout area are employed as the layout order information.

The scanner unit 18 reads a document placed on a document table (not shown). Also, the scanner unit 18 includes an auto document feeder (hereinafter referred to as the ADF) (not shown) for automatically feeding documents and is capable of continuously reading a plurality of documents placed on a document tray of the ADF.

The printer unit 19 prints various data such as document image data read by the scanner unit 18 and print data generated by the computer 30. The display unit 20 displays various information such as document image data read by the scanner unit 18. In this embodiment, the display unit 20 displays overlaid image data generated by executing the image overlaying program 14.

The operation unit 21 includes, for example, direction keys, a numeric keypad with which characters may be input, a determination button and the like and realizes a function as an input interface for various instructions. The operation unit 21 is provided with a start button for directing the start of execution of a scanner function and a copier function. Furthermore, the operation unit 21 functions as an input interface for an instruction to select an image overlay mode in which the image overlaying program 14 may be executed.

The network I/F 22 connects the printer 10 to the LAN and executes sending/receiving of various data through the LAN to/from an external device such as the computer 30.

Next, the computer 30 will be described. The computer 30 includes a control unit 31, a memory unit 35, an operation unit 40, a display unit 41 and a network I/F 42.

The control unit 31 controls the apparatus it belongs to and includes a CPU 32, a ROM 33 and a RAM 34. The CPU 32 controls various functions of the computer 30 in accordance with fixed values or programs stored in the ROM 33 and the RAM 34.

The ROM 33 is an unrewritable memory for storing control programs and the like to be executed in the computer. The RAM 34 is a rewritable volatile memory for temporarily storing various data. The RAM 34 stores, for example, document image data read by the printer 10 and data generated by an application program 36 described later.

In this embodiment, the RAM 34 stores document image data read by the printer 10 and read order information corresponding to the document image data in association with each other. Also, the RAM 34 stores a layout area included in template data and layout order information corresponding to the layout area in association with each other.

The memory unit 35 is constructed from, for example, a hard disk. The memory unit 35 stores the application program 36, an image overlaying program 37, an overlap area data 38 and an editing character string 39. The application program 36 is a program such as a document creation program or a spreadsheet program. The image overlaying program 37, the overlap area data 38 and the editing character string 39 are respectively constructed similarly to the image overlaying program 14, the overlap area data 15 and the editing character strings stored in the ROM 13 of the printer 10, and hence the detailed description is herein omitted.

The operation unit 40 includes, for example, a keyboard and a mouse and realizes a function as an input interface for various instructions. The display unit 41 displays various information such as document image data read by the printer 10. In this embodiment, the display unit 41 displays overlaid image data generated by executing the image overlaying program 37.

The network I/F 42 connects the computer 30 to the LAN for executing sending/receiving of various data to/from, for example, the printer 10.

<Operation of Embodiment>

Next, an operation of the printer 10 of this embodiment will be described in detail with reference to FIGS. 3 through 10.

(Image Overlaying Process)

First, the image overlaying process executed by the CPU 12 of the printer 10 will be described with reference to FIG. 3. This image overlaying process is a process for obtaining overlaid image data overlaid with document image data based on a plurality of documents inserted into one data, and is executed when the image overlay mode is selected by a user through the operation unit 21 and the start key is pressed. It is assumed in this embodiment that a template document described later has been placed on the document table and a plurality of documents have been placed on the document tray of the ADF when the start key is pressed by a user.

Figure 7:
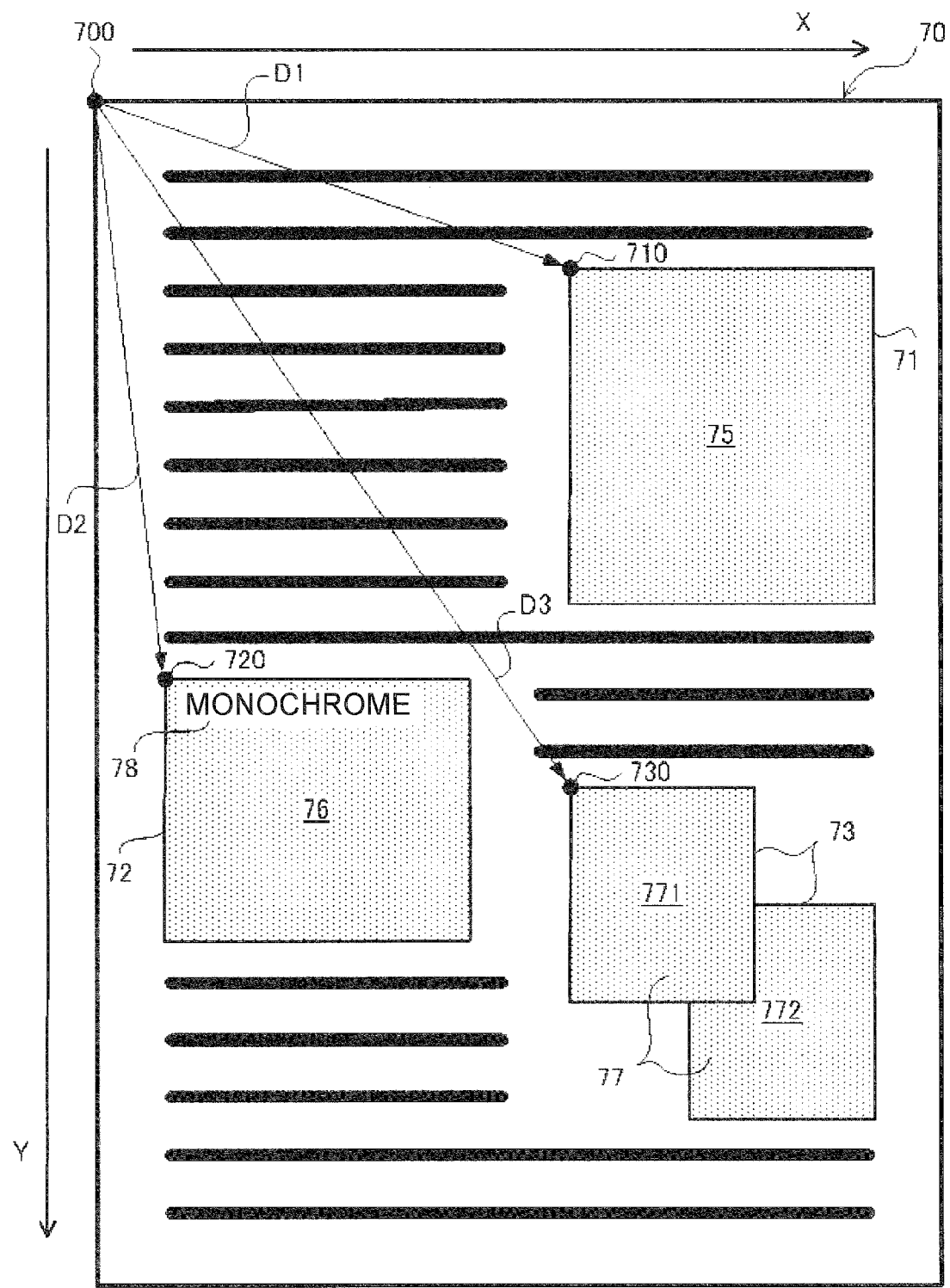
FIG. 7 is a diagram illustrating an example of template data.
Figure 9:
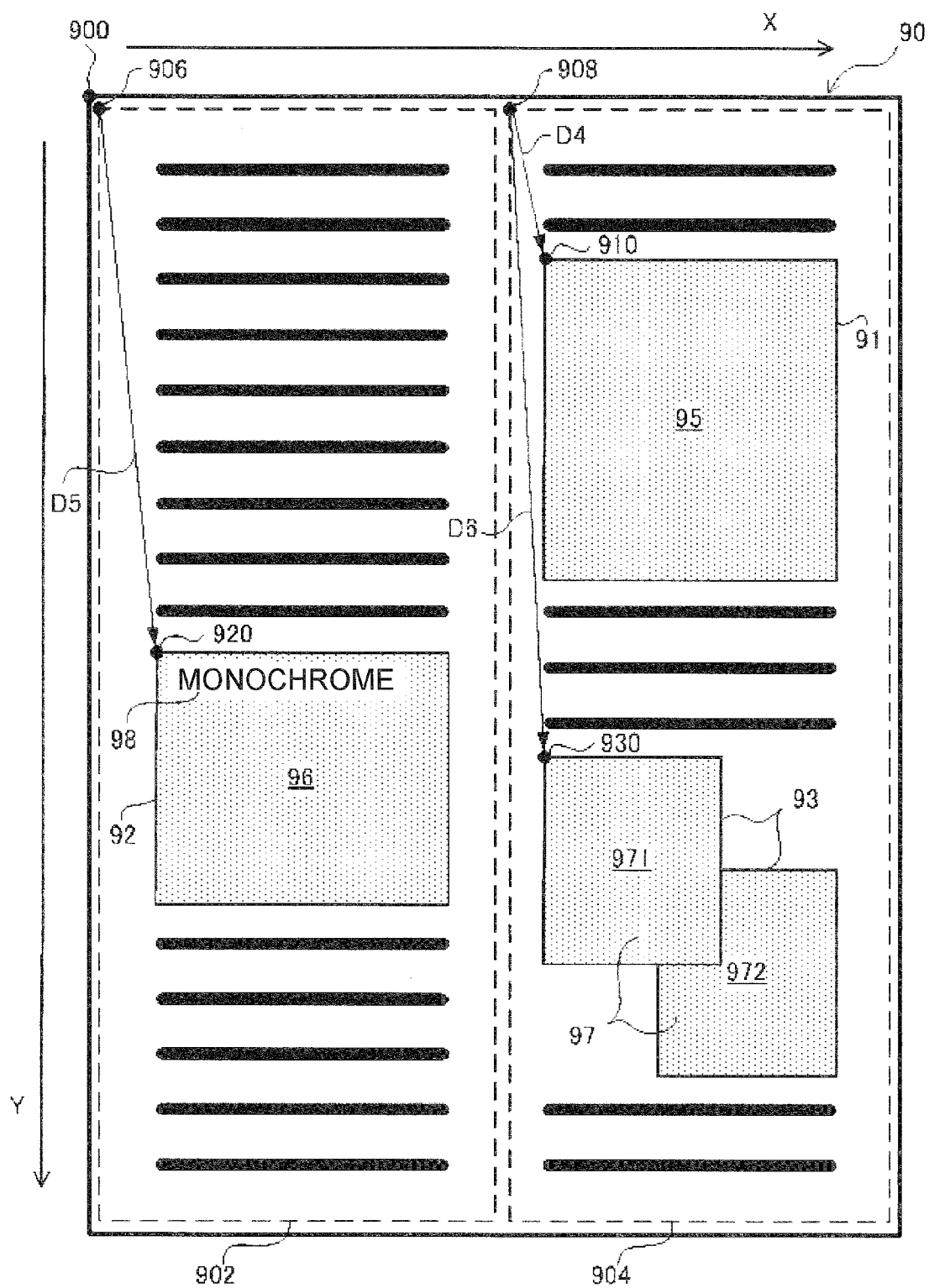
FIG. 9 is a diagram illustrating another example of the template data.

In this image overlaying process, the template document placed on the document table of the scanner unit 18 is first read, so as to generate template data (step 300, which step is hereinafter abbreviated as S). In the template document, an area in one document where a content of another document is desired to be laid out (namely, a layout area) is expressed as a rectangular figure or a figure in a shape stored as a part of the overlap area data 15. For example, on the basis of the template document, template data 70 or 90 illustrated in FIG. 7 or 9 is generated. The template data generated in S300 is stored in the RAM 17.

In S302, a layout area is extracted from the template data generated in S300. In S302, a layout area included in the template data is extracted in accordance with a rectangular coordinate system having the upper left corner of the template data set as a template origin. Specifically, a layout area is extracted by detecting an area border including sides of a rectangular figure corresponding to a layout area or a shape of an overlap area. For example, in the template data 70 illustrated in FIG. 7, area borders 71, 72 and 73 are detected in accordance with a rectangular coordinate system having the upper left corner of the template data 70 set as a template origin 700, so as to extract layout areas 75, 76 and 77.

Furthermore, as illustrated in FIG. 7, the rectangular coordinate system of the template data 70 is defined by an X-axis extending in the rightward direction from the template origin 700 and a Y-axis extending in the downward direction from the template origin 700. Assuming that the coordinates of the upper left corners of the respective area borders 71, 72 and 73 in the rectangular coordinate system of the template data 70 are area reference coordinates 710, 720 and 730, respectively, the positions of the respective layout areas 75, 76 and 77 in the template data 70 are determined on the basis of the area reference coordinates. In S302, the size of each layout area is determined on the basis of the extracted area border.

In S302, it is determined whether or not the overlap area data 15 includes a shape according with the shape of the extracted layout area, and when it is determined that it stores an accordant shape, the layout area is determined as an overlap area. Incidentally, an accordant shape is not limited to completely the same shape in this embodiment but the shape of the extracted layout area may be regarded as an accordant shape as far as it is recognized as a similar shape to one included in the stored overlap area data 15. It may be recognized to be similar shape if the both shapes include two rectangles, if a shift direction of the two rectangles is same and if which one of the two rectangles covering a part of the other is same. When it is determined as the overlap area, the number of document image data, which is to be laid out in the overlap area stored as a part of the overlap area data 15 in association with the shape of the overlap area, is read from the overlap area data 15. For example, in FIG. 7, since the shape of the layout area 77 accords with the shape stored as a part of the overlap area data 15 (see FIG. 2A), the number of document image data, "2", stored as a part of the overlap area data 15 is read.

The shape, the position, the size of each layout area and the number of layout areas extracted in S302 are stored in the RAM 17. The number of layout areas is the number of document image data to be laid out, and an overlap area includes layout areas in the same number as the number of document image data to be laid out in the overlap area. Specifically, the number of layout areas of the template data 70 of FIG. 7 is four, that is, the layout areas 75, 76, 771 and 772.

In S304, the layout order storing process (see FIG. 4A) described later is executed. In the layout order storing process, each layout area extracted in S302 and layout order information corresponding to the layout area are stored in association with each other, which will be described in detail later.

The plural documents placed on the document tray of the ADF are continuously read (S306), so as to generate document image data of the respective documents (S308).

Figure 6:
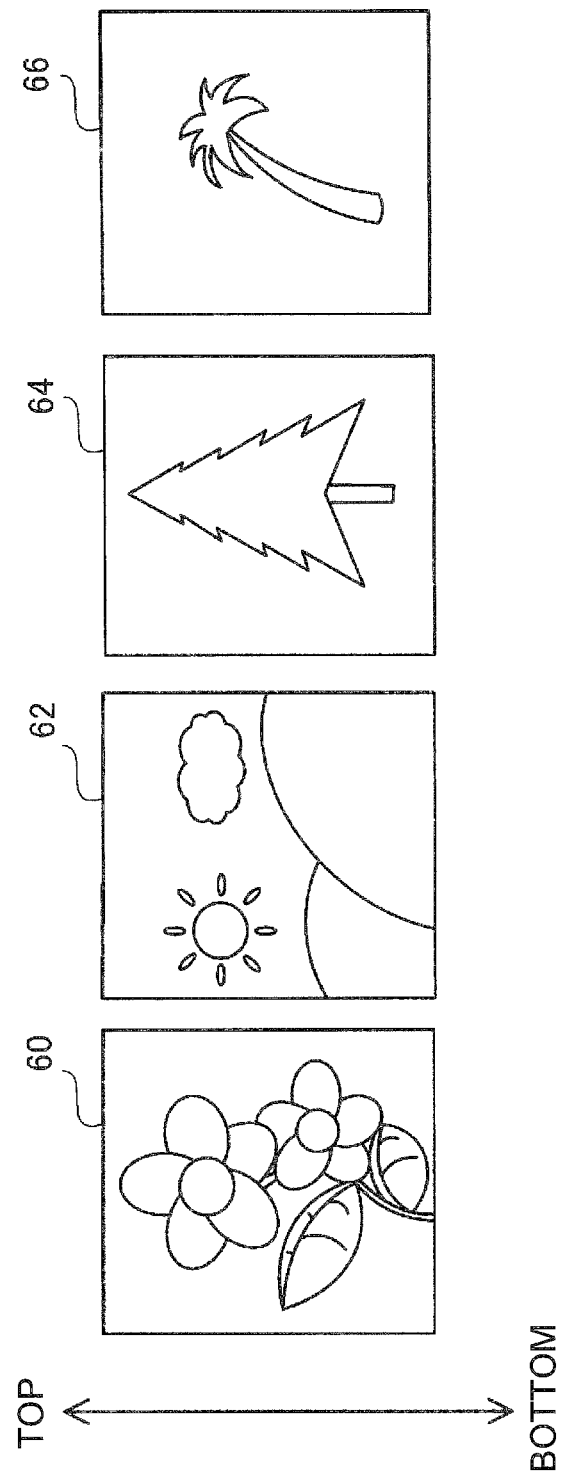
FIG. 6 is a diagram illustrating exemplary document image data.

In S310, each document image data generated in S308 and read order information are stored in the RAM 17 in association with each other. The read order information is a number corresponding to the order of the document in continuously reading the plural documents placed on the document tray of the ADF. For example, in the case where four documents illustrated in FIG. 6 are read in the order of left to right of FIG. 6, document image data 60 and read order "1", document image data 62 and read order "2", document image data 64 and read order "3" and document image data 66 and read order "4" are stored in the RAM 17 respectively in association with each other.

It is determined whether or not there remains a document placed on the document tray of the ADF (S312). When it is determined that there remains a document placed on the document tray of the ADF (i.e., YES in S312), the processing proceeds to S306.

When it is determined that there remains no document placed on the document tray of the ADF (i.e., NO in S312), it is determined whether or not the number N of document images accords with the number M of layout areas (S314).

Specifically, it is determined whether or not the number of document image data generated in S308 accords with the number of layout areas extracted in S302. When it is determined that the number N of document images and the number M of layout areas do not accord with each other (i.e., NO in S314), alarm processing is executed (S316), and this process is terminated. A case where there remains no document placed on the document tray of the ADF corresponds to a case where the number of document images is smaller than the number of layout areas. In the alarm processing of S316, the display unit 20 is made to display information that "the number of document images is larger than the number of layout areas." or "the number of document images is smaller than the number of layout areas."

When it is determined that the number N of document images and the number M of layout areas accord with each other (i.e., YES in S314), the value of a counter A is set to "0" (S318). The value of the counter A corresponds to the read order of document image data to be laid out next for overlay in a layout area. Specifically, the value corresponds to the layout order of a layout area where document image data is to be laid out next for overlay.

In S320, it is determined whether or not the value of the counter A accords with the number N of document images. When the value of the counter A accords with the number N of document images (i.e., YES in S320), print processing is executed (S322), and this process is terminated. In S322, overlaid image data overlaid through the image overlaying process is sent to the printer unit 19 to be printed on a printing paper. The overlaid image data will be described later.

When the value of the counter A does not accord with the number N of document images (i.e., NO in S320), the value of the counter A is incremented by "1" (S324), and the document image editing process (see FIG. 5) described later is executed (S326). The document image editing process is a process for editing document image data corresponding to each layout area on the basis of the size and the like of each layout area extracted in S302, which will be described in detail later.

In S328, document image data to be laid out in a layout area with layout order "A" is determined as document image data with read order "A". Then, the document image data with the read order "A" edited in S326 is laid out for overlay in the layout area with the layout order "A" of the template data stored in RAM 17. In S328, template data in which the document image data with the read order "A" has been overlaid is stored in the RAM 17, and the template data obtained before overlaying the document image data with the read order "A" is erased from the RAM 17. Then, the processing proceeds to S320.

(Layout Order Storing Process)

Next, the layout order storing process (corresponding to S304 of FIG. 3) executed by the CPU 12 of the printer 10 will be described with reference to FIGS. 4A and 4B.

This layout order storing process is a process for storing each layout area extracted in S302 of FIG. 3 and layout order information corresponding to the layout area in association with each other. In this embodiment, numbers obtained by ordering layout areas in the ascending order of the shortest distance from the upper left corner of the template data to the upper left corner of respective layout areas are employed as the layout order information.

In the layout order storing process, it is first determined whether or not any boundary extends over the whole length of the template data (S400). Specifically, a blank area with a given width or a boundary is detected over the whole length of the template data. For example, the template data 90 illustrated in FIG. 9 includes, in a center portion along the X-axis direction of the template data 90, a blank area with a given width extending in parallel to the Y-axis corresponding to the lengthwise direction of the template data 90. In this embodiment, it is assumed that blank portions provided in four edge portions of the template data are not regarded as a blank area with a given width extending over the whole length of the template data.

When it is determined that there is no such boundaries as a result of the determination made in S400 (i.e., NO in S400), area reference coordinates of respective layout areas included in the template data are read from the RAM 17 (S402).

With respect to each of the layout areas, an origin distance is calculated (S404). An origin distance may be the shortest distance from a template origin to the area reference coordinate of each layout area. For example, in the template data 70 of FIG. 7, origin distances may be shortest distances D1, D2 and D3 from the template origin 700 to the area reference coordinates 710, 720 and 730 of the respective layout areas 75, 76 and 77. In S404, with respect to each layout area, the origin distance is calculated on the basis of the area reference coordinate of the layout area and the coordinate of the template origin, and the calculated origin distance of each layout area is stored in the RAM 17.

In S406, the value of a counter T is set to "0". The value of the counter T corresponds to the number of layout areas having been stored in association with layout order information.

In S408, it is determined whether or not the value of the counter T accords with the number M of layout areas extracted in S302. When the value of the counter T accords with the number M of layout areas extracted in S302 (i.e., YES in S408), this process is terminated.

When the value of the counter T does not accord with the number M of layout areas extracted in S302 (i.e., NO in S408), a layout area with the shortest origin distance calculated in S404 is determined out of all the layout areas included in the template data (S410). In this embodiment, among layout areas included in the template data, a layout area having been stored in the RAM 17 in association with the layout order information is excluded from layout areas that may be determined in S410.

In S412, it is determined whether or not the layout area determined in S410 is an overlap area. Specifically, it is determined whether or not the shape of the area border of the layout area determined in S410 accords with any of the shapes of the overlap area stored as a part of the overlap area data 15 (shown in FIGS. 2A-2D).

When it is determined that the layout area is not an overlap area (i.e., NO in S412), the layout area determined in S410 is stored in the RAM 17 in association with a value obtained by incrementing the value of the counter T by "1" as the layout area information (S414). In S416, the value of the counter T is incremented by "1", and the processing proceeds to S408.

When it is determined that the layout area is an overlap area (i.e., YES in S412), the number i of image data to be laid out in the overlap area is read (S418). Specifically, the overlap area in the same shape as the overlap area determined in S412 is read from the overlap area data 15, and the number i of document image data to be laid out in the overlap area stored in association with the overlap area is read. In this embodiment, since an overlap area is a layout area where two document image data are laid out to partly overlap each other (shown in FIGS. 2A-2D), the number i of image data read in S412 is "2".

In S420, on the basis of the overlap order information stored as a part of the overlap area data 15 in association with the shape of the overlap area, the overlap area and the layout order information are stored in the RAM 17 in association with each other. Specifically, in accordance with the layout position and the layout order of each document image data in the overlap area stored as the overlap order information, the layout order information is stored in association with each area for laying out one document image data.

Figure 2A:
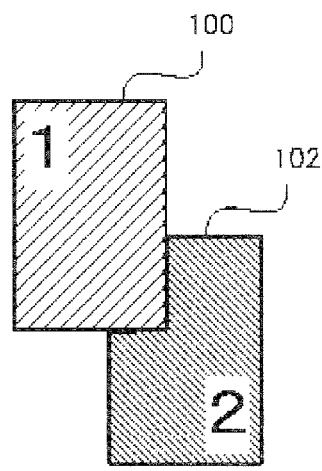
FIGS. 2A, 2B, 2C and 2D are diagrams illustrating exemplary shapes of an overlap area.
Figure 2B:
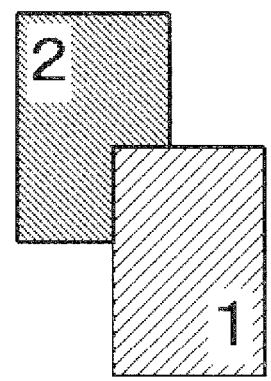
Figure 2C:
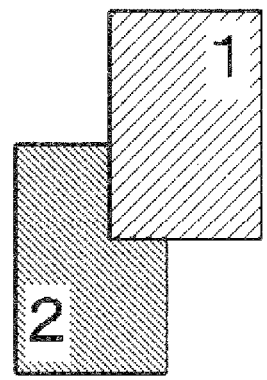
Figure 2D:
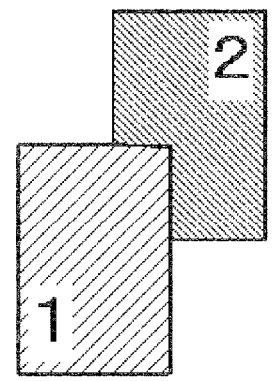

For example, in the template data 70 of FIG. 7, when the layout area 77 corresponding to the overlap area is determined in S410, since the shape of the layout area 77 accords with the shape of the overlap area of FIG. 2A, the number of document image data, "2", and the overlap order information stored in association with the shape of the overlap area of FIG. 2A are read from the overlap area data 15. The layout positions included in this overlap order information are the layout area 100 and the layout area 102 included in the overlap area of FIG. 2A. The layout order included in this overlap order information is "1" for the layout area 100 and "2" for the layout area 102. Accordingly, in the layout area 77, the area 771 corresponding to the layout area 100 of FIG. 2A and a value obtained by adding "1" as the layout order information to the value of the counter T are stored in the RAM 17 in association with each other. Furthermore, in the layout area 77, the area 772 corresponding to the layout area 102 of FIG. 2A and a value obtained by adding "2" as the layout order information to the value of the counter T are stored in the RAM 17 in association with each other.

In S422, the number i of image data is added to the value of the counter T, and the processing proceeds to S408.

When it is determined that there is such a boundary as a result of the determination made in S400 (i.e., YES in S400), divided areas divided by the boundary are extracted (S424). For example, in the template data 90 of FIG. 9, the blank area with a given width disposed at the center portion along the X-axis direction of the template data 90 and extending in parallel to the Y-axis is regarded as the boundary, and a divided area 902 and a divided area 904 are extracted.

In S424, assuming the upper left corner of each divided area as a division origin, the position of the division origin is determined in accordance with the rectangular coordinate system of the template data 90. The determined position of the division origin is stored in the RAM 17.

In S426, each divided area extracted in S424 and division order corresponding to the order of executing the layout order storing process are stored in the RAM 17 in association with each other. In this embodiment, the division order corresponds to a number obtained by ordering divided areas from one disposed on the left hand side in the template data.

In S428, the value of a counter S is set to "1". The value of the counter S corresponds to the division order of a divided area to be subjected to the layout order storing process.

In S430, the number K of layout areas included in a divided area with division order "S" is obtained. Specifically, on the basis of the positions of the divided areas extracted in S424 and the positions of the layout areas extracted in S302 of FIG. 3, the number K of layout areas is calculated to be stored in the RAM 17. For example, the divided area 902 of the template data 90 of FIG. 9 includes a layout area 96, and hence, the number K of layout areas is "1".

In S432, the area reference coordinate of the layout area included in the divided area with the division order "S" is read from the RAM 17 in the same manner as in S402. In S434, with respect to each layout area included in the divided area with the division order "S", a division origin distance is calculated. The division origin distance is the shortest distance from the division origin to the area reference coordinate of each layout area. For example, in the divided area 902 of FIG. 9, the division origin distance corresponds to the shortest distance D5 from a division origin 906 to an area reference coordinate 920 of the layout area 96. In S434, the division origin distance is calculated with respect to each layout area on the basis of the area reference coordinate of the layout area and the coordinate of the division origin, and the calculated division origin distance of each layout area is stored in the RAM 17.

In S436, the value of the counter T is set to "0". In S438, it is determined whether or not the value of the counter T accords with the number K of layout areas included in the divided area with the division order "S".

When it is determined that the value of the counter T does not accord with the number K of layout areas included in the divided area with the division order "S" as a result of the determination made in S438 (i.e., NO in S438), a layout area with the shortest division origin distance calculated in S434 is determined out of all the layout areas included in the divided area with the division order "S" (S440). In this embodiment, a layout area having been stored in the RAM 17 in association with layout order information out of the layout areas included in the divided area with the division order "S" is excluded from layout areas that may be determined in S440.

It is determined in the same manner as in S412 whether or not the layout area determined in S440 is an overlap area (S442). When it is determined that the layout area is not an overlap area (i.e., NO in S442), the layout area determined in S440 is stored in the RAM 17 in association with layout order information (S444). In S444, the layout order information corresponds to a value obtained by adding "1" to a sum of the number K of layout areas included in a divided area with a division order "S−1" and the value of the counter T. In S446, the value of the counter T is incremented by "1", and the processing proceeds to S438.

When it is determined that the layout area is an overlap area (i.e., YES in S442), the number i of image data to be laid out in this overlap area is read from the overlap area data 15 in the same manner as in S418 (S448).

In S450, on the basis of the overlap order information stored as a part of the overlap area data 15 in association with the shape of the overlap area, the overlap area is stored in the RAM 17 in association with layout order information. Specifically, in accordance with the layout position and the layout order of each document image data included in the overlap area stored as the overlap order information, the layout order information is stored in association with each layout area for laying out one document image data.

For example, in the template data 90 of FIG. 9, when a layout area 97 corresponding to an overlap area is determined in S440, since the shape of the layout area 97 accords with the shape of the overlap area of FIG. 2A, the number of document image data, "2", and the overlap order information stored in association with the shape of the overlap area of FIG. 2A are read from the overlap area data 15. With respect to the layout area 97, an area 971 corresponding to the layout area 100 of FIG. 2A is stored in the RAM 17 in association with a value obtained by adding "1" as the layout order information to a prescribed value. Also, with respect to the layout area 97, an area 972 corresponding to the layout area 102 of FIG. 2A is stored in the RAM 17 in association with a value obtained by adding "2" as the layout order information to the prescribed value. The prescribed value herein corresponds to a sum of the number K of layout areas included in the divided area with the division order "S−1" and the value of the counter T.

In S452, the number i of image data is added to the value of the counter T, and the processing proceeds to S438.

When it is determined that the value of the counter T accords with the number K of layout areas included in the divided area with the division order "S" as a result of the determination made in S438 (i.e., YES in S438), it is determined whether or not the value of the division order "S" accords with the number Y of divided areas extracted in S424 (S454).

When it is determined that the value of the division order "S" accords with the number Y of divided areas extracted in S424 (i.e., YES in S454), this process is terminated. When it is determined the value of the division order "S" does not accord with the number Y of divided areas extracted in S424 (i.e., NO in S454), the value of the counter S is incremented by "1" (S456) and the processing proceeds to S430.

(Document Image Editing Process)

Next, the document image editing process executed by the CPU 12 of the printer 10 (corresponding to S326 of FIG. 3) will be described with reference to FIG. 5.

This document image editing process is a process for editing document image data corresponding to each layout area on the basis of the size and the like of the layout area extracted in S302 of FIG. 3.

In this document image editing process, it is first determined whether or not a character string stored in the editing character strings 16 is provided in a layout area with layout order "A" (S500). Specifically, it is determined whether or not a character string is provided by analyzing the template data through optical character recognition (hereinafter abbreviated as "OCR") or the like. Incidentally, the determination method employed in S500 is not limited to this method but any of various methods may be employed as far as it may be determined whether or not a character string is provided in a layout area.

When it is determined that a character string stored in the editing character strings 16 is not provided in the layout area with the layout order "A" as a result of the determination made in S500 (i.e., NO in S500), the processing proceeds to S506. When it is determined that a character string stored in the editing character strings 16 is provided in the layout area with the layout order "A" as a result of the determination made in S500 (i.e., YES in S500), an editing content corresponding to the character string extracted from the layout area with the layout order "A" is read from the editing character strings 16 (S502).

In S504, document image data with read order "A" is edited on the basis of the editing content read in S502. Specifically, editing processing on the document image data with the read order "A" is executed on the basis of a program stored in the editing character strings 16 in association with the character string. For example, when a character string of "monochrome" is extracted in S500, it is determined whether or not the document image data with the read order "A" is monochrome image data, and when it is color image data, monochrome processing is executed so as to store resultant in the RAM 17. When the document image data with the read order "A" is monochrome image data, the monochrome image data is directly stored in the RAM 17. In the case where it is impossible to execute the editing processing corresponding to the extracted character string, the display unit 20 displays information that the editing processing cannot be executed.

In S506, it is determined whether or not the size of the layout area with the layout order "A" (hereinafter referred to as the "layout area size") accords with the size of the document image data with the read order "A" (hereinafter referred to as the "document image size"). When it is determined that the layout area size with the layout order "A" accords with the document image size with the read order "A" (i.e., YES in S506), this process is terminated.

When it is determined that the layout area size with the layout order "A" is not compatible with the document image size with the read order "A" (i.e., NO in S506), the display unit 20 displays information that the layout area size with the layout order "A" is not compatible with the document image size with the read order "A" (S508). In addition to the information that the layout area size with the layout order "A" is not compatible with the document image size with the read order "A", a message for making a user to determine whether or not processing for enlarging/reducing the document image data with the read order "A" is to be executed may be displayed. In the display of the information that the layout area size with the layout order "A" is not compatible with the document image size with the read order "A", for example, a reduced image of the template data and the document image with the read order "A" may be displayed on the display unit 20 while displaying the layout area with the layout order "A" corresponding to the reduced image in a mode different from other layout areas.

In S510, it is determined whether or not the layout area size with the layout order "A" is smaller than the document image size with the read order "A". When it is determined that the layout area size with the layout order "A" is smaller than the document image size with the read order "A" (i.e., YES in S510), it is determined whether or not a reducing instruction has been accepted from the user through the operation unit 21 (S512). The reducing instruction is an instruction to reduce the document image data input by the user through operation of the operation unit 21 on the basis of the message displayed in the display unit 20 in S508 that the layout area size with the layout order "A" is not compatible with the document image size with the read order "A".

When it is determined that the reducing instruction has been accepted (i.e., YES in S512), the document image data with the read order "A" is reduced in accordance with the layout area size with the layout order "A" (S514), and this process is terminated.

When it is determined that the reducing instruction has not been accepted (i.e., NO in S512), the document image data with the read order "A" is cut in accordance with the layout area size with the layout order "A" (S516), and this process is terminated. In S516, edges of the document image data with the read order "A" are cut on the basis of the center thereof so that the resultant document image data may attain a size according with the layout area size with the layout order "A". Specifically, portions of the document image data with the read order "A" protruding from the layout area with the layout order "A" when the center of the layout area with the layout order "A" and the center of the document image data with the read order "A" are overlapped each other are cut.

When it is determined that the layout area size with the layout order "A" is larger than the document image size with the read order "A" as a result of the determination made in S510 (i.e., NO in S510), it is determined whether or not an enlarging instruction has been accepted from the user through the operation unit 21 in the same manner as in S512 (S518). The enlarging instruction is an instruction to enlarge the document image data input by the user through operation of the operation unit 21 on the basis of the message displayed on the display unit 20 in S508 that the layout area size with the layout order "A" is not compatible with the document image size with the read order "A".

When it is determined that the enlarging instruction has been accepted (i.e., YES in S518), the document image data with the read order "A" is enlarged in accordance with the layout area size with the layout order "A" (S520), and this process is terminated.

When it is determined that the enlarging instruction has not been accepted (i.e., NO in S518), the document image data with the read order "A" is provided with margins in accordance with the layout area size with the layout order "A" (S522), and this process is terminated. In S522, the document image data with the read order "A" is provided with margins in its edges on the basis of the center thereof so that the resultant document image data may attain a size according with the layout area size with the layout order "A". Specifically, margins are provided in the edges of the document image data with the read order "A" so as to be compatible with the layout area size with the layout order "A" when the center of the layout area with the layout order "A" and the center of the document image data with the read order "A" are overlapped each other.

At this point, the image overlaying process, the layout order storing process and the document image editing process of FIGS. 3 through 5 will be described by exemplifying the document image data illustrated in FIG. 6 and the template data illustrated in FIG. 7.

The document image data 60, 62, 64 and 66 illustrated in FIG. 6 are document image data generated by continuously reading them with the ADF in the order of the document image data 60, the document image data 62, the document image data 64 and the document image data 66. It is assumed that all of the document image data 60, 62, 64 and 66 of FIG. 6 are color image data obtained by reading color documents and have an image size according to A4 size. The vertical direction of each document image data corresponds to the vertical direction illustrated with arrows in FIG. 6.

The template data 70 of FIG. 7 has an image size according to A3 size, and includes the layout area 75 formed by the area border 71, the layout area 76 formed by the area border 72 and the layout area 77 formed by the area border 73. In the layout area 76, a character string 78 of "monochrome" is provided. The layout area 77 is an overlap area, in which document image data may be laid in each of the layout areas 771 and 772. The layout areas 75, 76 and 77 respectively have the area reference coordinates 710, 720 and 730, and the shortest distances from the template origin 700 to the respective area reference coordinates are respectively origin distances D1, D2 and D3. The rectangular coordinate system of the template data 70 is defined by the X-axis extending in the rightward direction from the template origin 700 disposed on the upper left corner and the Y-axis extending in the downward direction from the template origin 700.

In this embodiment, it is assumed that the layout area sizes of the layout areas 75, 76, 771 and 772 are smaller than the document image sizes of the document image data 60, 62, 64 and 66, and that the respective document image data are reduced in accordance with the layout area sizes to be laid out.

First, in S300 of FIG. 3, the template data 70 of FIG. 7 is generated. In S302, the area borders 71, 72 and 73 are detected in accordance with the rectangular coordinate system having the template origin 700 of the template data 70, so as to extract the layout areas 75, 76 and 77, and the extracted layout areas are stored in the RAM 17. Since the layout area 77 is an overlap area, the shape of an overlap area according with the shape of the overlap area 77 is read from the overlap area data 15, and the number of document image data to be laid out in the overlap area stored in association with the read shape, namely, "2", is read. The number of layout areas included in the template data 70, namely, "4", is stored in the RAM 17. Next, the layout area order storing process is executed (S304).

At this point, the layout area order storing process (corresponding to S304 of FIG. 3) will be described with reference to FIGS. 4A and 4B. In S400, since the template data 70 of FIG. 7 does not have a blank area with a given width or a boundary extending over the whole length along the Y-axis direction (i.e., NO in S400), the processing proceeds to S402. In S402, the area reference coordinates 710, 720 and 730 of the layout areas 75, 76 and 77 are read from the RAM 17, and the origin distances D1, D2 and D3 of the respective layout areas are calculated to be stored in the RAM 17 (S404).

In S406, the value of the counter T is set to "0". In S408, since the value of the counter T, "0", does not accord with the number of layout areas, "4", extracted in S302 (i.e., NO in S408), the processing proceeds to S410.

Since the size relationship among the origin distances D1, D2 and D3 in the template data 70 of FIG. 7 is D1<D2<D3, the layout area 75 with the shortest origin distance D1 is determined in S410. In S412, since the layout area 75 is not an overlap area (i.e., NO in S412), the layout area 75 is stored in the RAM 17 in association with a value "1" obtained by adding "1" as the layout area information to the value of the counter T, "0" (S414). In S416, the value of the counter T is incremented to "1", and the processing proceeds to S408.

In S408, since the value of the counter T, "1", does not accord with the number of layout areas, "4" (i.e., NO in S408), the processing proceeds to S410.

In S410, the layout area 76 having the origin distance D2, which is shortest among the origin distances D2 and D3 excluding the origin distance D1 of the layout area 75 already associated with the layout area information, is determined. In S412, since the layout area 76 is not an overlap area (i.e., NO in S412), the layout area 76 is stored in the RAM 17 in association with a value "2" obtained by adding "1" as the layout area information to the value of the counter T, "1" (S414). In S416, the value of the counter T is incremented to "2", and the processing proceeds to S408.

In S408, since the value of the counter T, "2", does not accord with the number of layout areas, "4" (i.e., NO in S408), the processing proceeds to S410.

In S410, the layout area 77 having the origin distance D3 apart from the origin distances D1 and D2 of the layout areas 75 and 76 already associated with the layout area information is determined. In S412, since the layout area 77 is an overlap area (i.e., YES in S412), the processing proceeds to S418.

In S418, the overlap area (see FIG. 2A) in the same shape as the overlap area 77 is read from the overlap area data 15, and the number of document image data to be laid out in the overlap area 77, namely, "2", is read from the overlap area data 15.

In S420, overlap order information stored in association with the shape of the overlap area of FIG. 2A is read from the overlap area data 15. A layout position and a layout order included in the overlap order information are "1" for the layout area 100 and "2" for the layout area 102 in the overlap area of FIG. 2A. Therefore, in the layout area 77, the area 771 corresponding to the layout area 100 of FIG. 2A is stored in the RAM 17 in association with a value "3" obtained by adding "1" as the layout order information to the value of the counter T, "2". Also, in the layout area 77, the area 772 corresponding to the layout area 102 of FIG. 2A is stored in the RAM 17 in association with a value "4" obtained by adding "2" as the layout order information to the value of the counter T, "2".

In S422, the number of image data, "2", is added to the value of the counter T, "2", and the processing proceeds to S408. In S408, since the value of the counter T, "4", accords with the number of layout areas, "4" (i.e., YES in S408), this process is terminated. In this manner, the layout area 75 and the layout order "1", the layout area 76 and the layout order "2", the layout area 771 and the layout order "3" and the layout area 772 and the layout order "4" are stored in the RAM 17 respectively in association with each other.

Referring to the image overlaying process of FIG. 3 again, in S306, the four documents placed on the document tray of the ADF are continuously read so as to generate the document image data of the respective documents as illustrated in FIG. 6 (S308). Since the document image data of FIG. 6 are generated by continuously reading the documents with the ADF in the order of the document image data 60, the document image data 62, the document image data 64 and the document image data 66, the document image data 60 and read order "1", the document image data 62 and read order "2", the document image data 64 and read order "3" and the document image data 66 and read order "4" are stored in the RAM 17 respectively in association with each other.

In S312, since there is no document placed on the document tray of the ADF (i.e., NO in S312), the processing proceeds to S314. In S314, since the number of document images, "4", accords with the number of layout areas, "4" (i.e., YES in S314), the value of the counter A is set to "0" (S318).

In S320, since the value of the counter A, "0", does not accord with the number of document images, "4" (i.e., NO in S320), the value of the counter A is incremented to "1" (S324), and the document image editing process is executed (S326).

At this point, the document image editing process (corresponding to S326 of FIG. 3) will be described with reference to FIG. 5. In S500, the template data is analyzed through the OCR, and since no character string is provided in the layout area 75 with the layout order "1" (i.e., NO in S500), the processing proceeds to S506.

In this embodiment, the layout area size of the layout area 75 is smaller than the document image size of the document image data 60 with the read order "1" (i.e., NO in S506 and NO in S510), the display unit 20 displays information that the layout area size of the layout area 75 is not compatible with the document image size of the document image data 60 with the read order "1" (S508).

In S512, since a reducing instruction is accepted from a user through the operation unit 21 (i.e., YES in S512), the document image data 60 is reduced in accordance with the layout area size of the layout area 75 (S514), and the document image editing process for the document image data 60 is terminated.

Referring to the image overlaying process of FIG. 3 again, in S328, the document image data 60 with the read order "1" having been edited as described above is laid out in the layout area 75 with the layout order "1" to be overlaid. The resultant template data 70 in which the document image data 60 has been overlaid is stored in the RAM 17, and the template data 70 having been stored in the RAM 17 before overlaying the document image data 60 is erased. Then, the processing proceeds to S320.

In S320, since the value of the counter A, "1", does not accord with the number of document images, "4" (i.e., NO in S320), the value of the counter A is incremented to "2" (S324), and the document image editing process is executed (S326).

In the same manner as in the aforementioned document image editing process for the document image data 60, in S500 of FIG. 5, the template data is analyzed through the OCR, and the character string 78 of "monochrome" is extracted from the layout area 76 with the layout order "2". Therefore, since the layout area 76 is provided with the character string (i.e., YES in S500), a program stored in association with the character string of "monochrome" is read from the editing character strings 16 (S502).

Figure 8:
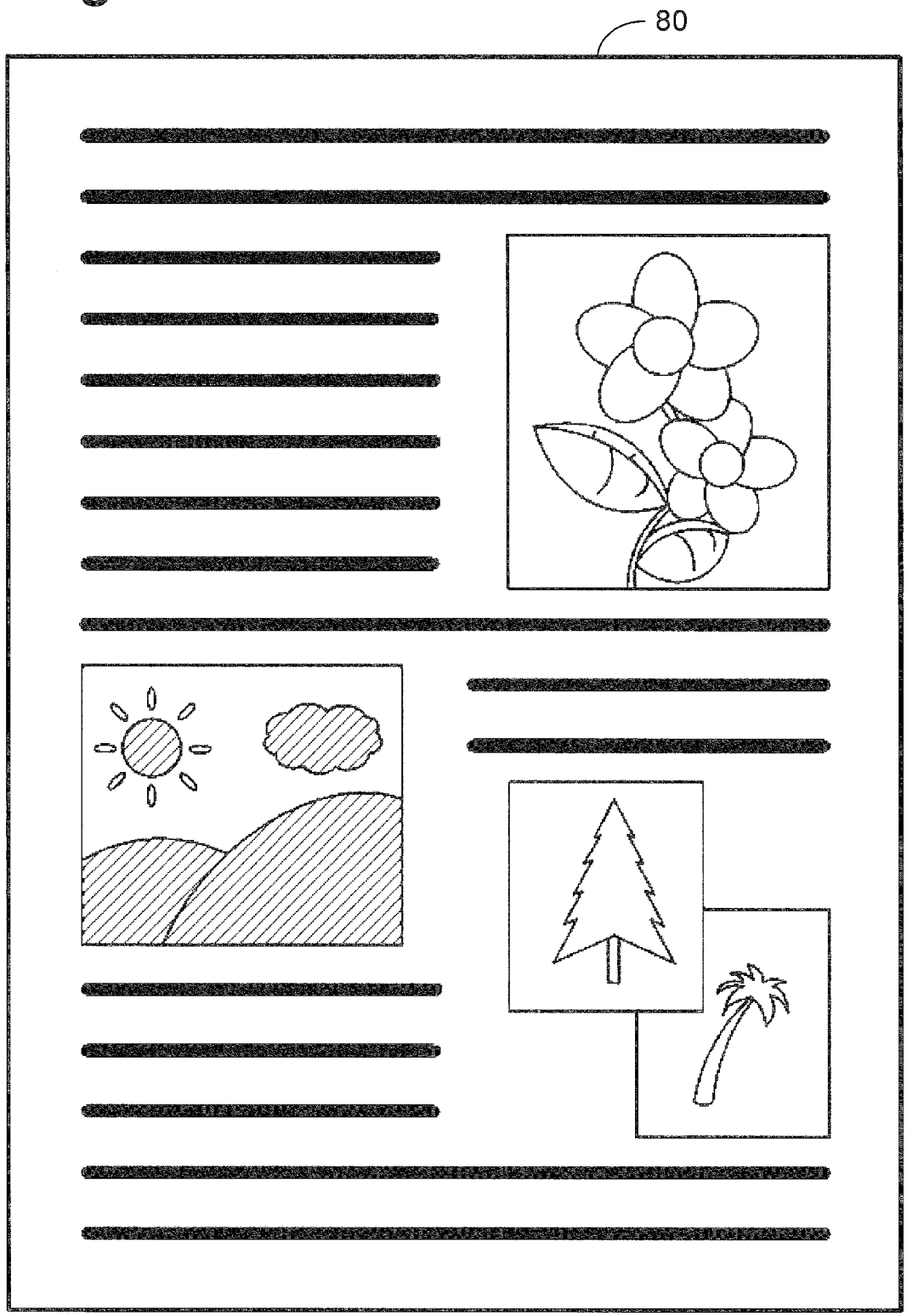
FIG. 8 is a diagram illustrating an example of overlaid image data.

Since the document image data 62 of FIG. 6 is color image data, the monochrome processing is executed in accordance with the program read in S502, and the resultant data is stored in the RAM 17. In FIG. 8, a monochrome image is hatched with lines sloping from right to left.

In this embodiment, since the layout area size of the layout area 76 is smaller than the document image size of the document image data 62 with the read order "2" (i.e., NO in S506 and NO in S510), the display unit 20 displays information that the layout area size is not compatible with the document image size (S508).

In S512, since a reducing instruction is accepted from the user through the operation unit 21 (i.e., YES in S512), the document image data 62 is reduced in accordance with the layout area size of the layout area 76 (S514), and the document image editing process for the document image data 62 is terminated.

Referring to the image overlaying process of FIG. 3 again, in S328, the document image data 62 with the read order "2" having been edited as described above is laid out in the layout area 76 with the layout order "2" to be overlaid. The resultant template data 70 in which the document image data 62 has been overlaid is stored in the RAM 17, and the template data 70 having been stored in the RAM 17 before overlaying the document image data 62 is erased. Then, the processing proceeds to S320.

In S320, since the value of the counter A, "2", does not accord with the number of document images, "4" (i.e., NO in S320), the value of the counter A is incremented to "3" (S324), and the document image editing process is executed (S326).

In the same manner as in the aforementioned document image editing process for the document image data 60, in S500 of FIG. 5, the template data is analyzed through the OCR, and since no character string is provided in the layout area 771 with the layout order "3" (i.e., NO in S500), the processing proceeds to S506.

In this embodiment, the layout area size of the layout area 771 is smaller than the document image size of the document image data 64 with the read order "3" (i.e., NO in S506 and NO in S510), the display unit 20 displays information that the layout area size of the layout area 771 is not compatible with the document image size of the document image data 64 with the read order "3" (S508).

In S512, since a reducing instruction is accepted from the user through the operation unit 21 (i.e., YES in S512), the document image data 64 is reduced in accordance with the layout area size of the layout area 771 (S514), and the document image editing process for the document image data 64 is terminated.

Referring to the image overlaying process of FIG. 3 again, in S328, the document image data 64 with the read order "3" having been edited as described above is laid out in the layout area 771 with the layout order "3" to be overlaid. The resultant template data 70 in which the document image data 64 has been overlaid is stored in the RAM 17, and the template data 70 having been stored in the RAM 17 before overlaying the document image data 64 is erased. Then, the processing proceeds to S320.

In S320, since the value of the counter A, "3", does not accord with the number of document images, "4" (i.e., NO in S320), the value of the counter A is incremented to "4" (S324), and the document image editing process is executed (S326).

In the same manner as in the aforementioned document image editing process for the document image data 60, in S500 of FIG. 5, the template data is analyzed through the OCR, and since no character string is provided in the layout area 772 with the layout order "4" (i.e., NO in S500), the processing proceeds to S506.

In this embodiment, the layout area size of the layout area 772 is smaller than the document image size of the document image data 66 with the read order "4" (i.e., NO in S506 and NO in S510), the display unit 20 displays information that the layout area size of the layout area 772 is not compatible with the document image size of the document image data 66 with the read order "4" (S508).

In S512, since a reducing instruction is accepted from the user through the operation unit 21 (i.e., YES in S512), the document image data 66 is reduced in accordance with the layout area size of the layout area 772 (S514), and the document image editing process for the document image data 66 is terminated.

Referring to the image overlaying process of FIG. 3 again, in S328, the document image data 66 with the read order "4" having been edited as described above is laid out in the layout area 772 with the layout order "4" to be overlaid. The resultant template data 70 in which the document image data 66 has been overlaid is stored in the RAM 17, and the template data 70 having been stored in the RAM 17 before overlaying the document image data 66 is erased. Then, the processing proceeds to S320.

In S320, since the value of the counter A, "4", accords with the number of document images, "4" (i.e., YES in S320), overlaid image data 80 (see FIG. 8) corresponding to the template data 70 resulting from the overlay performed in S328 is read from the RAM 17 to be printed on a printing paper by the printer unit 19 (S322). In FIG. 8, hatching with lines sloping from right to left provided in the overlaid document image data means that the document image data is monochrome image data. Also, in the overlaid image data 80 of FIG. 8, the document image data without the hatching means that the document image data is color image data.

Next, the image overlaying process, the layout order storing process and the document image editing process of FIGS. 3 through 5 will be described by similarly exemplifying the document image data of FIG. 6 with the template data changed to the template data of FIG. 9 having the boundary.

The rectangular coordinate system of the template data 90 of FIG. 9 is defined by the X-axis extending in the rightward direction from a template origin 900 disposed on the upper left corner and the Y-axis extending in the downward direction from the template origin 900. The template data 90 has an image size according to A3 size and includes, in a center portion along the X-axis direction, a blank area with a given width extending in parallel to the Y-axis. The template data 90 is divided, by a boundary of the blank area, into the divided area 902 disposed on the left hand side of the template data 90 and the divided area 904 disposed on the right hand side of the template data 90. The divided areas 902 and 904 respectively have division origins 906 and 908 on their upper left corners. The divided area 902 includes the layout area 96 formed by an area border 92, and a character string 98 of "monochrome" is provided in the layout area 96. The layout area 96 has the area reference coordinate 920, and the shortest distance from the division origin 906 to the area reference coordinate 920 corresponds to the division origin distance D5. The divided area 904 includes a layout area 95 formed by an area border 91 and the layout area 97 formed by an area border 93. The layout area 97 is an overlap area, in which document image data may be laid out respectively in the layout area 971 and the layout area 972. The layout areas 95 and 97 respectively have area reference coordinates 910 and 930, and the shortest distances from the division origin 908 respectively to the area reference coordinates 910 and 930 correspond to the division origin distances D4 and D6.

In this embodiment, it is assumed that the layout area sizes of the layout areas 95, 96, 971 and 972 are smaller than the document image sizes of the document image data 60, 62, 64 and 66, and that the respective document image data are reduced in accordance with the layout area sizes to be laid out.

First, in S300 of FIG. 3, the template data 90 of FIG. 9 is generated. In S302, the area borders 91, 92 and 93 are detected in accordance with the rectangular coordinate system having the template origin 900 of the template data 90, so as to extract the layout areas 95, 96 and 97, and the extracted layout areas are stored in the RAM 17. Since the layout area 97 is an overlap area, a shape of the overlap area according with the shape of the overlap area 97 is read from the overlap area data 15, and the number of document image data to be laid out in the overlap area stored in association with the read shape, namely, "2", is read. The number of layout areas included in the template data 90 is "4", which is stored in the RAM 17. Next, the layout area order storing process is executed (S304).

At this point, the layout area order storing process (corresponding to S304 of FIG. 3) will be described with reference to FIGS. 4A and 4B. In S400, since the template data 90 of FIG. 9 has the blank area with a given width extending over the whole length along the Y-axis direction (i.e., YES in S400), the two divided areas, that is, the divided area 902 and the divided area 904, are extracted to be stored in the RAM 17 in S424. The positions of the division origins 906 and 908 of the divided areas 902 and 904 are stored in the RAM 17.

In S426, the divided area 902 and division order "1" and the divided area 904 and division order "2" are stored in the RAM 17 respectively in association with each other. In S428, the value of the counter S is set to "1".

In S430, since a layout area included in the division area 902 with the division order "1" is the layout area 96 alone, the number of layout areas is obtained as "1". In S432, the area reference coordinate 920 of the layout area 96 is read from the RAM 17, and the division origin distance D5 of the layout area 96 is calculated to be stored in the RAM 17 (S434).

In S436, the value of the counter T is set to "0". In S438, since the value of the counter T, "0", does not accord with the number of layout areas, "1", obtained in S430 (i.e., NO in S438), the processing proceeds to S440.

Since the layout area included in the divided area 902 is the layout area 96 alone, the layout area 96 is determined in S440. In S442, since the layout area 96 is not an overlap area (i.e., NO in S442), the layout area 96 is stored in the RAM 17 in association with a value "1" obtained by adding "1" as the layout area information to the value of the counter T, "0" (S444). In S446, the value of the counter T is incremented to "1", and the processing proceeds to S438.

In S438, since the value of the counter T, "1", accords with the number of layout areas, "1" (i.e., YES in S438), the processing proceeds to S454. In S454, since the division order "1" does not accord with the number of divided areas, "2", extracted in S424 (i.e., NO in S454), the value of the counter S is incremented to "2" (S456), and the processing proceeds to S430.

In S430, since layout areas included in the divided area 904 with the division order "2" are three, that is, the layout area 95 and the layout areas 971 and 972 included in the layout area 97, the number of layout areas is obtained as "3". In S432, the area reference coordinates 920 and 930 of the layout areas 95 and 97 are read, and the division origin distances D4 and D6 of the layout areas 95 and 97 are calculated to be stored in the RAM 17 (S434).

In S436, the value of the counter T is set to "0". In S438, since the value of the counter T, "0", does not accord with the number of layout areas, "3", obtained in S430 (i.e., NO in S438), the processing proceeds to S440.

Since the size relationship between the division origin distances D4 and D6 in the divided area 904 of FIG. 9 is D4<D6, the layout area 95 with the shortest division origin distance D4 is determined in S440. In S442, since the layout area 95 is not an overlap area (i.e., NO in S442), the layout area 95 is stored in the RAM 17 in association with layout area information (S444). The layout area information is a value "2" obtained by adding "1" to a sum of the number of layout areas, "1", of the divided area 902 with the division order "1" and the value of the counter T, "0". In S446, the value of the counter T is incremented to "1", and the processing proceeds to S438.

In S438, since the value of the counter T, "1", does not accord with the number of layout areas, "3" (i.e., NO in S438), the processing proceeds to S440. In S440, the layout area 97 having the division origin distance D6 apart from the division origin distance D4 of the layout area 95 already associated with the layout area information is determined. In S442, since the layout area 97 is an overlap area (i.e., YES in S442), the processing proceeds to S448.

In S448, the overlap area (see FIG. 2A) in the same shape as the overlap area 97 is read from the overlap area data 15, and the number of document image data to be laid out in the overlap area 97, namely, "2", is read from the overlap area data 15.

In S450, overlap order information stored in association with the shape of the overlap area of FIG. 2A is first read from the overlap area data 15. The layout position and the layout order included in the overlap order information are "1" for the layout area 100 and "2" for the layout area 102 in the overlap area of FIG. 2A. Therefore, with respect to the layout area 97, the area 971 corresponding to the layout area 100 of FIG. 2A is stored in the RAM 17 in association with a value "3" obtained by adding "1" as the layout order information to a prescribed value "2". Also, with respect to the layout area 97, the area 972 corresponding to the layout area 102 of FIG. 2A is stored in the RAM 17 in association with a value "4" obtained by adding "2" as the layout order information to the prescribed value "2". The prescribed value "2" is a sum of the number of layout areas, "1", of the divided area 902 with the division order "1" and the value of the counter T, "1".

In S452, the number of image data, "2", is added to the value of the counter T, "1", so as to increment the value of the counter T to "3", and the processing proceeds to S438. In S438, since the value of the counter T, "3", accords with the number of layout areas, "3" (i.e., YES in S438), the processing proceeds to S454.

In S454, since the division order "2" accords with the number of divided areas, "2", extracted in S424 (i.e., YES in S454), this process is terminated. In this manner, the layout area 96 and the layout order "1", the layout area 95 and the layout order "2", the layout area 971 and the layout order "3" and the layout area 972 and the layout order "4" are stored in the RAM 17 respectively in association with each other.

Referring to the image overlaying process of FIG. 3 again, the four documents placed on the document tray of the ADF are continuously read (S306), so as to generate the document image data of the respective documents as illustrated in FIG. 6 (S308). The document image data of FIG. 6 is stored in the same manner as in image overlaying means for the template data 70 of FIG. 7, so that the document image data 60 and the read order "1", the document image data 62 and the read order "2", the document image data 64 and the read order "3" and the document image data 66 and the read order "4" may be stored in the RAM 17 respectively in association with each other.

In S312, since there is no document placed on the document tray of the ADF (i.e., NO in S312), the processing proceeds to S314. In S314, since the number of document images, "4", accords with the number of layout areas, "4" (i.e., YES in S314), the value of the counter A is set to "0" (S318).

In S320, since the value of the counter A, "0", does not accord with the number of document images, "4" (i.e., NO in S320), the value of the counter A is incremented to "1" (S324), and the document image editing process is executed (S326).

At this point, the document image editing process (corresponding to S326 of FIG. 3) will be described with reference to FIG. 5. In S500 of FIG. 5, the template data is analyzed through the OCR, and the character string 98 of "monochrome" is extracted from the layout area 96 with the layout order "1". Therefore, since the layout area 96 is provided with the character string (i.e., YES in S500), a program stored in association with the character string of "monochrome" is read from the editing character strings 16 (S502).

Figure 10:
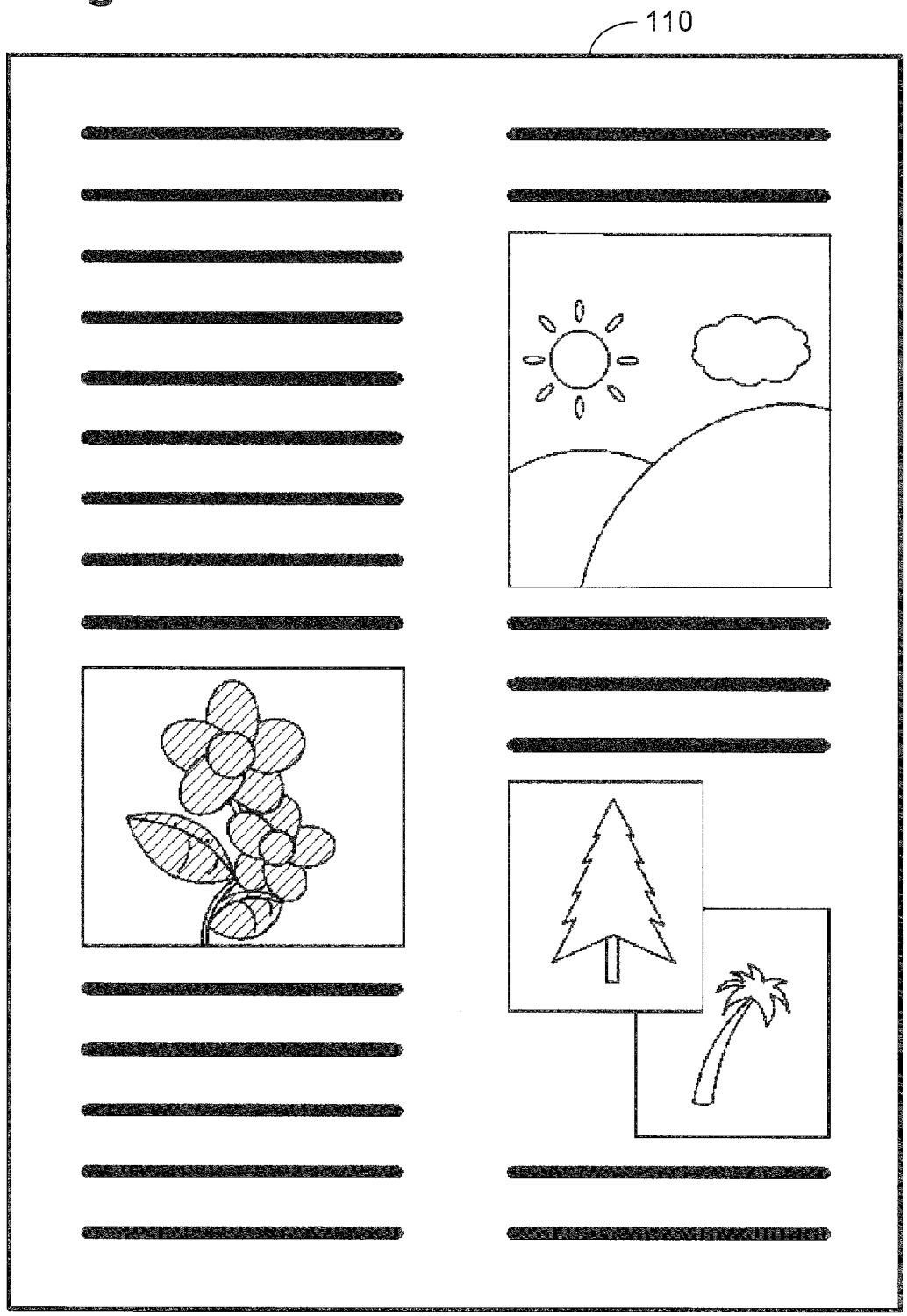
FIG. 10 is a diagram illustrating another example of the overlaid image data.

Since the document image data 60 of FIG. 6 is color image data, the monochrome processing is executed in accordance with the program read in S502, and the resultant data is stored in the RAM 17. In FIG. 10, a monochrome image is hatched with lines sloping from right to left.

In this embodiment, since the layout area size of the layout area 96 is smaller than the document image size of the document image data 60 with the read order "1" (i.e., NO in S506 and NO in S510), the display unit 20 displays information that the layout area size of the layout area 96 is not compatible with the document image size of the document image data 60 with the read order "1" (S508).

In S512, since a reducing instruction is accepted from the user through the operation unit 21 (i.e., YES in S512), the document image data 60 is reduced in accordance with the layout area size of the layout area 96 (S514), and the document image editing process for the document image data 60 is terminated.

Referring to the image overlaying process of FIG. 3 again, in S328, the document image data 60 with the read order "1" having been edited as described above is laid out in the layout area 96 with the layout order "1" to be overlaid. The resultant template data 90 in which the document image data 60 has been overlaid is stored in the RAM 17, and the template data 90 having been stored in the RAM 17 before overlaying the document image data 60 is erased. Then, the processing proceeds to S320.

In S320, since the value of the counter A, "1", does not accord with the number of document images, "4" (i.e., NO in S320), the value of the counter A is incremented to "2" (S324), and the document image editing process is executed (S326).

In the same manner as in the aforementioned document image editing process for the document image data 60, in S500, the template data is analyzed through the OCR, and since no character string is provided in the layout area 95 with the layout order "2" (i.e., NO in S500), the processing proceeds to S506.

In this embodiment, the layout area size of the layout area 95 is smaller than the document image size of the document image data 62 with the read order "2" (i.e., NO in S506 and NO in S510), the display unit 20 displays information that the layout area size of the layout area 95 is not compatible with the document image size of the document image data 62 with the read order "2" (S508).

In S512, since a reducing instruction is accepted from the user through the operation unit 21 (i.e., YES in S512), the document image data 62 is reduced in accordance with the layout area size of the layout area 95 (S514), and the document image editing process for the document image data 62 is terminated.

Referring to the image overlaying process of FIG. 3 again, in S328, the document image data 62 with the read order "2" having been edited as described above is laid out in the layout area 95 with the layout order "2" to be overlaid. The resultant template data 90 in which the document image data 62 has been overlaid is stored in the RAM 17, and the template data 90 having been stored in the RAM 17 before overlaying the document image data 62 is erased. Then, the processing proceeds to S320.

In S320, since the value of the counter A, "2", does not accord with the number of document images, "4" (i.e., NO in S320), the value of the counter A is incremented to "3" (S324), and the document image editing process is executed (S326).

In the same manner as in the aforementioned document image editing process for the document image data 60, in S500 of FIG. 5, the template data is analyzed through the OCR, and since no character string is provided in the layout area 971 with the layout order "3" (i.e., NO in S500), the processing proceeds to S506.

In this embodiment, the layout area size of the layout area 971 is smaller than the document image size of the document image data 64 with the read order "3" (i.e., NO in S506 and NO in S510), the display unit 20 displays information that the layout area size of the layout area 971 is not compatible with the document image size of the document image data 64 with the read order "3" (S508).

In S512, since a reducing instruction is accepted from the user through the operation unit 21 (i.e., YES in S512), the document image data 64 is reduced in accordance with the layout area size of the layout area 971 (S514), and the document image editing process for the document image data 64 is terminated.

Referring to the image overlaying process of FIG. 3 again, in S328, the document image data 64 with the read order "3" having been edited as described above is laid out in the layout area 971 with the layout order "3" to be overlaid. The resultant template data 90 in which the document image data 64 has been overlaid is stored in the RAM 17, and the template data 90 having been stored in the RAM 17 before overlaying the document image data 64 is erased. Then, the processing proceeds to S320.

In S320, since the value of the counter A, "3", does not accord with the number of document images, "4" (i.e., NO in S320), the value of the counter A is incremented to "4" (S324), and the document image editing process is executed (S326).

In the same manner as in the aforementioned document image editing process for the document image data 60, in S500 of FIG. 5, the template data is analyzed through the OCR, and since no character string is provided in the layout area 972 with the layout order "4" (i.e., NO in S500), the processing proceeds to S506.

In this embodiment, the layout area size of the layout area 972 is smaller than the document image size of the document image data 66 with the read order "4" (i.e., NO in S506 and NO in S510), the display unit 20 displays information that the layout area size of the layout area 972 is not compatible with the document image size of the document image data 66 with the read order "4" (S508).

In S512, since a reducing instruction is accepted from the user through the operation unit 21 (i.e., YES in S512), the document image data 66 is reduced in accordance with the layout area size of the layout area 972 (S514), and the document image editing process for the document image data 66 is terminated.

Referring to the image overlaying process of FIG. 3 again, in S328, the document image data 66 with the read order "4" having been edited as described above is laid out in the layout area 972 with the layout order "4" to be overlaid. The resultant template data 90 in which the document image data 66 has been overlaid is stored in the RAM 17, and the template data 90 having been stored in the RAM 17 before overlaying the document image data 66 is erased. Then, the processing proceeds to S320.

In S320, since the value of the counter A, "4", accords with the number of document images, "4" (i.e., YES in S320), overlaid image data 110 (see FIG. 10) corresponding to the template data 90 resulting from overlay performed in S328 is read from the RAM 17 to be printed on a printing paper by the printer unit 19 (S322). In FIG. 10, the hatching with lines sloping from right to left provided in the overlaid document image data means that the document image data is monochrome image data. Also, in the overlaid image data 110 of FIG. 10, the document image data without the hatching means that the document image data is color image data.

As described so far, according to this embodiment, with respect to the layout areas 75 through 77 or 95 through 97 extracted from the template data 70 or 90 in which a plurality of layout areas for laying out the document image data 60 through 66 are defined, each layout area and corresponding layout order information are stored in association with each other (see S414, S424, S444 and S450 of FIGS. 4A and 4B), and each of the document image data 60 through 66 and corresponding read order information are stored in association with each other (see S310 of FIG. 3). Furthermore, one overlaid image data 80 or 110 (see FIG. 8 or 10) is generated by laying out each document image data in a layout area with layout order information corresponding to the read order information of the document image data. Therefore, the overlaid image data 80 or 110 desired by a user may be generated merely through operations performed by the user principally of setting a template document and documents, selecting the image overlay mode in the operation unit 21 and pressing the start key. Accordingly, in the case where image data is to be obtained through overlay by inserting a plurality of document image data 60 through 66 into one data, the workload of the user may be reduced, namely, the convenience may be improved.

The overlap area data 15 includes a plurality of kinds of shapes of the overlap area as illustrated in FIGS. 2A-2D, and with respect to each of the plural kinds of shapes of the overlap area, the number of document image data to be laid out in the overlap area and overlap order information corresponding to layout positions and layout orders of the plural document image data to be laid out in the overlap area are stored in association with each other. Furthermore, when a layout area extracted from the template data 70 or 90 is determined as an overlap area on the basis of the shape of the overlap area (i.e., YES in S412 and S442 of FIGS. 4A and 4B), the layout order information in the same number as the number of the document image data is stored on the basis of the overlap order information in association with the layout positions of the document image data to be laid out in the overlap area (see S420 and 5450 of FIGS. 4A and 4B). Therefore, even when an overlap area is extracted as a layout area as in the template data 70 or 90 of FIG. 7 or 9, overlaid image data overlaid as desired by a user may be generated while reducing the workload of the user.

The editing character strings 16 stores a character string and an editing content in association with each other, and when there is, in a layout area, a character string 78 or 98 stored in the editing character storings (i.e., YES in S500 of FIG. 5), document image data to be laid out in the layout area is edited on the basis of the editing content associated with the character string 78 or 98 (see S504 of FIG. 5). Therefore, overlaid image data 80 or 110 overlaid as desired by a user may be generated without the user performing an editing operation on each document image data, resulting in further reducing the workload of the user.

When the layout area size of each layout area is not compatible with the document image size of document image data to be laid out in the layout area, the document image data is edited so as to attain an accordant size with the layout area size (see S512 through S522 of FIG. 5). Thus, overlaid image data 80 or 110 attractive for a user may be generated.

With the upper left corner of the template data 70 regarded as the template origin 700, the origin distances D1 through D3, that is, the shortest distances from the template origin 700 respectively to the area reference coordinates 710 through 730 on the upper left corners of the layout areas, are calculated (see S404 of FIG. 4A). On the basis of the calculated origin distances D1 through D3, layout order information is stored in association with each layout area. Therefore, a user may easily recognize the layout order information stored in association with each layout area, and the overlaid image data 80 overlaid as desired by the user may be definitely generated.

A blank area with a given width or a boundary extending over the whole length (corresponding to the Y-axis direction of FIG. 9) of the template data 90 is detected (see S400 of FIG. 4A). Then, in the divided areas 902 and 904 divided by the blank area or the boundary, the upper left corners of the divided areas 902 and 904 are defined as the division origins 906 and 908. On the basis of the division origin distances D4 through D6 corresponding to the shortest distances from the division origins 906 and 908 to the area reference coordinates 910 through 930 on the upper left corners of the layout areas 95 through 97, layout order information is stored in association with each layout area (see FIG. 4B). Therefore, even in template data in a format divided along a prescribed direction as in, for example, the template data 90 of FIG. 9, a user may easily recognize layout order information stored in association with each layout area, and hence, overlaid image data 110 overlaid as desired by the user may be more definitely generated.

Although the preferred embodiment of the invention has been described so far, the present invention is not limited to the aforementioned embodiment but various modifications may be made without departing from the scope of the invention.

The image overlaying process (see FIG. 3), the layout order storing process (see FIGS. 4A and 4B) and the document image editing process (see FIG. 5) are executed by the CPU 12 of the printer 10 in the above-described embodiment. The printer 10 serves as an example of an image overlaying device in the above-described embodiment. On the contrary, these processes may be executed by the CPU 32 of the computer 30 instead such that the computer 30 serves as an example of an image overlaying device. In the case where the image overlaying process, the layout order storing process and the document image editing process are executed by the CPU 32 of the control portion 31 (an example of a controller) of the computer 30, the procedures of S300 and S306 of FIG. 3 of reading the template document and the documents are replaced with a procedure of acquiring data having been read by the scanner unit 18 of the printer 10 through the network I/F 22 and I/F 42 (an example of image inputting unit) by the CPU 32. In this case, the printing procedure of S322 corresponds to a printing instruction to the printer 10 issued by the CPU 32 of the computer 30.

Although the template data generated by reading the template document placed on the document table of the scanner unit 18 is used in S300 of FIG. 3 in this embodiment, for example, template data precedently read by the scanner unit 18 or template data generated by the computer 30 may be used instead.

In this embodiment, the area borders are detected in accordance with the rectangular coordinate system of the template data so as to determine the positions of the layout areas in S302 of FIG. 3. However, when template data precedently stored is used, for example, the procedures of S304 and after that may be executed without performing the procedure of S302 if information of layout areas acquired in precedently executing the image overlaying process using the template data is stored in association with the template data. Furthermore, when the template data generated by the computer 30 is used, for example, the procedures of S304 and after that may be executed without performing the procedure of S302 if information of layout areas is stored in association with the template data.

In this embodiment, in the layout order storing process of FIGS. 4A and 4B, the numbers obtained by ordering the layout areas in the ascending order of the shortest distance from the upper left corner of the template data or the divided area to the upper left corner of each layout area are used as the layout order information. However, the layout order information is not limited to such numbers but may employ any of various forms as far as layout areas included in the template data may be ordered in accordance with the layout order information. The ordering method for the layout areas is not limited to that using the shortest distance from the upper left corner of the template data or the divided area to the upper left corner of each layout area but may be any of various forms can be used. Furthermore, although the layout areas are ordered in the ascending order of the shortest distance in the layout order information, the layout areas may be ordered in the descending order of the shortest distance.

Although the numbers corresponding to the order of continuously reading the plural documents placed on the ADF are used as the read order information in S310 of FIG. 3 in this embodiment, the read order information may be in any of various forms as far as generated plural document image data are ordered in accordance with the read order information.

Although an overlap area is a layout area where two document image data are laid out to partly overlap each other in this embodiment, an overlap area is not limited to such a layout area but may be a layout area where three or more document image data are laid out to partly overlap one another.

Although the shapes of layout areas included in the template data are rectangular shapes or shapes of figures stored as a part of the overlap area data 15 in this embodiment, the shapes may be a circular shape, a triangular shape, a polygonal shape or the like. In this case, figures in the circular shape, the triangular shape, the polygonal shape or the like are precedently stored in the ROM 13. Also in this case, document image data is edited so that the document image size may be compatible with the layout area size of the layout area in the circular, triangular, polygonal shape or the like in the same manner as in S512 through S522 of FIG. 5. Specifically, when an enlarging instruction or a reducing instruction is accepted, the document image data is enlarged or reduced in accordance with the layout area size in the same manner as in S514 and S520. When an enlarging or reducing instruction is not accepted, the edges of the document image data are cut or are provided with margins so that the document image data may attain an accordant size with the layout area size on the basis of the center of the document image data in the same manner as in S516 and S522.

Although a blank area with a given width or a boundary extending along the whole length (corresponding to the Y-axis direction of FIG. 9) of the template data is regarded as a boundary between divided areas in S400 of FIG. 4A in this embodiment, a blank area with a given width or a boundary may extend over the whole width along the X-axis direction as the boundary in the template data 90 of FIG. 9. Alternatively, a blank area with a given width or a boundary may extend over the whole diagonal of the template data as the boundary.

Although the template data generated by reading the template document is analyzed for extracting the layout areas in S302 of FIG. 3 in this embodiment, the template document may be analyzed while being read.

Although the print processing of the overlaid image data 80 or 110 is executed in S322 of FIG. 3 in this embodiment, the overlaid image data 80 or 110 may be, for example, transmitted to the computer 30 through the network I/Fs 22 and 42 without being printed.

What is claimed is:

1. An image overlaying device comprising:
    an image inputting unit configured to input image data of documents;
    a memory;
    a controller configured to:
        obtain template data, which define a plurality of layout areas, for laying out the inputted image data of each of the documents;
        extract each of the plurality of layout areas from the obtained template data;
        determine positions of the extracted plurality of layout areas;
        store, in the memory, in association with each of the plurality of layout areas, layout order information corresponding to an order of the plurality of layout areas before the image inputting unit inputs the image data of each of the documents;
        store, in the memory, in association with each of the image data, image order information corresponding to an order of the image data of the documents;
        determine corresponding image data of documents corresponding to each of the plurality of layout areas based on the layout order information and the image order information;
        store, in the memory, a plurality of shapes for an overlap area corresponding to a layout area where a plurality of document image data are laid out to partly overlap each other, each of the plurality of shapes represents a contour of the overlap area in which the plurality of document image data are to be laid out to partly overlap each other;
        determine whether or not each of the extracted plurality of layout areas is the overlap area by determining whether or not each of the extracted plurality of layout areas has a shape which accords with one of the shapes of the overlap area stored in the memory; and
        generate overlaid image data by laying out, in each of the plurality of layout areas, the determined corresponding image data of the documents,
    wherein the controller is configured to store, in the memory, with respect to each of the plurality of shapes of the overlap area, the number of document image data to be laid out in the overlap area in association with overlap order information corresponding to layout positions and layout orders of image data to be laid out in the overlap area, and
    wherein the controller is configured to, when the controller determines that the layout area is the overlap area, store, in the memory, based on the overlap order information, layout order information respectively for each of the image data stored in the memory in association with the layout positions of the image data in the overlap area.

2. The image overlaying device according to claim 1, wherein the controller further configured to:
    store, in the memory, a character string in association with an editing content;
    determine whether or not the character string stored in the memory is provided in each of the extracted layout areas; and
    edit, when the character string is determined to be provided in the layout area, the image data determined to correspond to the layout area provided with the character string based on the editing content stored in the memory in association with the character string,
    wherein the controller is configured to generate the overlaid image data by laying out each edited image data in the corresponding layout area.

3. The image overlaying device according to claim 2, wherein the controller further configured to determine whether or not a size of each of the plurality of layout areas accords with a size of the image data correspond to the layout area,
    wherein when the size of the layout area is determined to be incompatible with the size of the image data, the controller edits the image data into a size compatible with the layout area.

4. The image overlaying device according to claim 1, wherein the controller further configured to store, in the memory, the layout order information in association with each of the layout areas based on a distance from an origin set on a corner of the template data to a corner of each of the layout areas.

5. The image overlaying device according to claim 4, wherein the controller further configured to detect a blank area with a given width or a boundary extending over a whole length along a specific direction of the obtained template data, and store, in the memory, the layout order information in association with each of the layout areas, with respect to each of divided areas obtained by dividing the template data by the detected blank area or the detected boundary, on the basis of a distance from an origin set on a specific corner of each of the divided areas to a corner of each of the layout areas.

6. The image overlaying device according to claim 1, further comprising a printing unit configured to print an image on a paper based on the generated overlaid image data.

7. The image overlaying device according to claim 1, wherein the image order information is corresponding to an order of the document image data in inputting the plurality of documents by the image inputting unit.

8. The image overlaying device according to claim 1, wherein the image inputting unit comprises an image reading unit configured to read images of the documents to generate the image data of the documents.

9. A non-transitory computer-readable medium for an image overlaying device comprising a memory and an image inputting unit configured to input image data of documents, the computer-readable medium storing instructions which causes, when executed, a processor to execute steps of:

obtaining template data which define a plurality of layout areas for laying out the inputted image data of each of the documents;

extracting each of the plurality of layout areas from the obtained template data;

determining positions of the extracted plurality of layout areas;

storing, in the memory, in association with each of the plurality of layout areas, layout order information corresponding to an order of the plurality of layout areas before the image inputting unit inputs the image data of each of the documents;

storing, in the memory, in association with each of the image data, image order information corresponding to an order of the image data of the documents;

determining corresponding image data of documents corresponding to each of the plurality of layout areas based on the layout order information and the image order information;

storing, in the memory, a plurality of shapes for an overlap area corresponding to a layout area where a plurality of document image data are laid out to partly overlap each other, each of the plurality of shapes represents a contour of the overlap area in which the plurality of document image data are to be laid out to partly overlap each other;

determining whether or not each of the extracted plurality of layout areas is the overlap area by determining whether or not each of the extracted plurality of layout areas has a shape which accords with one of the shapes of the overlap area stored in the memory; and generating overlaid image data by laying out, in each of the plurality of layout areas, the determined corresponding image data of the documents, wherein the number of document image data to be laid out in the overlap area in association with overlap order information corresponding to layout positions and layout orders of image data to be laid out in the overlap area are stored in the memory with respect to each of the plurality of shapes of the overlap area, and wherein when it is determined that the layout area is the overlap area, layout order information is stored in the memory, respectively, for each of the image data stored in the memory in association with the layout positions of the image data in the overlap area based on the overlap order information.

\* \* \* \* \*